US008280798B1

(12) United States Patent
Benda

(10) Patent No.: US 8,280,798 B1
(45) Date of Patent: *Oct. 2, 2012

(54) FUND FOR HEDGING REAL ESTATE OWNERSHIP RISK USING FINANCIAL PORTFOLIO THEORY AND DATA FEED FOR ANALYZING THE FINANCIAL PERFORMANCE OF A PORTFOLIO THAT INCLUDES REAL ESTATE

(76) Inventor: Peter Benda, Glen Allen, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,675

(22) Filed: May 23, 2011

Related U.S. Application Data

(63) Continuation of application No. 11/716,823, filed on Mar. 12, 2007, now Pat. No. 7,970,684, which is a continuation-in-part of application No. 11/589,631, filed on Oct. 30, 2006, now Pat. No. 7,822,668.

(60) Provisional application No. 60/731,829, filed on Oct. 31, 2005, provisional application No. 60/781,798, filed on Mar. 13, 2006.

(51) Int. Cl.
*G06Q 40/00* (2012.01)
(52) U.S. Cl. .................................... 705/36 R
(58) Field of Classification Search ............... 705/35–45
See application file for complete search history.

(56) References Cited

U.S. PATENT DOCUMENTS

| | | | |
|---|---|---|---|
| 5,987,435 A | 11/1999 | Weiss et al. | |
| 6,021,397 A | 2/2000 | Jones et al. | |
| 6,513,020 B1 | 1/2003 | Weiss et al. | |
| 2003/0172018 A1 | 9/2003 | Chen et al. | |

OTHER PUBLICATIONS

Ray Torto, "Strategic Portfolio Analysis: A New Approach", Torto Wheaton Research, pp. 1-8, Jul. 1999.
Susan Hudson-Wilson et al. "Investment Analysis: Applying MPT to REIT Portfolios", pp. 1-10.
Barry Vinocur, "Lack of Correlation", Dow Jones Property: Property Fundamentals, pp. 1-6, Winter 2000.
D. Geltner et al, Ch. 15, Real Estate Investment Trusts: Structure, Analysis and Strategy R. Garrigan, J. Parsons, ed., New York, McGraw-Hill, pp. 371-401, 1998.

(Continued)

*Primary Examiner* — Rajesh Khattar
(74) *Attorney, Agent, or Firm* — Sills, Cummins & Gross P.C.

(57) ABSTRACT

A method for creating an investment fund and selling shares in the fund to individual investors, each of whom has an investment ratio defined by a dollar amount of direct real estate investments held by the investor outside of the fund divided by a dollar amount of shares in the fund held by the individual investor. A target range of the investment ratio is selected for the fund. A target geographical region is selected where individual investors in the fund hold the direct real estate investments. A model composite portfolio is identified having an asset combination that includes: (i) direct real estate investment held by an individual investor in the target geographical region, and (ii) shares in the fund held by the individual investor. The asset combination in the model composite portfolio has an investment ratio that is within the target range. An optimal fund asset allocation is selected for the composite model portfolio in order to diversify and/or hedge risks associated with the direct real estate investment held by the model composite portfolio. Shares of the fund are sold to individual investors that hold direct real estate investments in the target geographic region and have investment ratios in the target range.

32 Claims, 14 Drawing Sheets

OTHER PUBLICATIONS

David B. Loeper, "Asset Allocation Math, Methods and Mistakes", Wealthcare Capital Management White Paper, pp. 1-11, Jun. 2001.

Petros Sivitanides, "Why Invest in Real Estate: An Asset Allocation Perspective", Real Estate Issues, vol. 22, No. 1, Apr. 1997.

Zoran Ivkorvic et al. "Portfolio Concentration and the Performance of Individual Investors", pp. 1-45, Nov. 2005.

Timothy W. Viezer, "Constructing real estate investment portfolios: how to use models and a few tools to build a diverse portfolio", Business Economics, pp. 1-10, 1999.

Bob Taylor, "Developing Portfolio Optimization Models", The MathWorks News & Notes, pp. 30-32, Oct. 2006.

Michael S. Young et al. Drums Along the Efficient Frontier, Real Estate Review, Winter pp. 18-29, Winter 1992.

Daniel Andersson et al. "The Impact of Leveraged Real Estate on Mixed-Asset Portfolios", Master Thesis, Stockholm, 2003.

Richard B. Gold, "The Use of MPT for Real Estate Portfolios in an Uncertain World", Journal of Real Estate Portfolio Management, vol. 2, No. 2, pp. 95-106, 1996.

Harry M. Markowitz, "Foundations of Portfolio Theory", Nobel Lecture, Economic Sciences, pp. 279-287, 1990.

Robert J. Shiller et al., "Home Equity Insurance", NBER Working Paper Series, Working Paper No. 4830, Aug. 1994.

William Francis Tucker, "A Real Estate Portfolio Optimizer", Johns Hopkins University Real Estate Investment Thesis, 2000-2001.

Gregory Curtis, "Modern Portfolio Theory and Quantum Mechanics", The Journal of Wealth Management, pp. 1-7, Fall 2002.

Mehndi Pirbhai, "Portfolio Optimization: The rise of Markowitz Mean-Variance models and beyond", pp. 1-10.

M. Pirbhai et al., "Portfolio Optimization", Nov. 2001.

John Alexander McNair, "Using Microsoft Excel to Build Efficient Frontiers via the Mean Variance Optimization Method", pp. 1-23, Apr. 14, 2003.

"Why Real Estate? An Investment Rationale for Institutional Investors: 2001 Update", Property and Portfolio Research, Real Estate / Portfolio Strategist, vol. 5, No. 4, 2001.

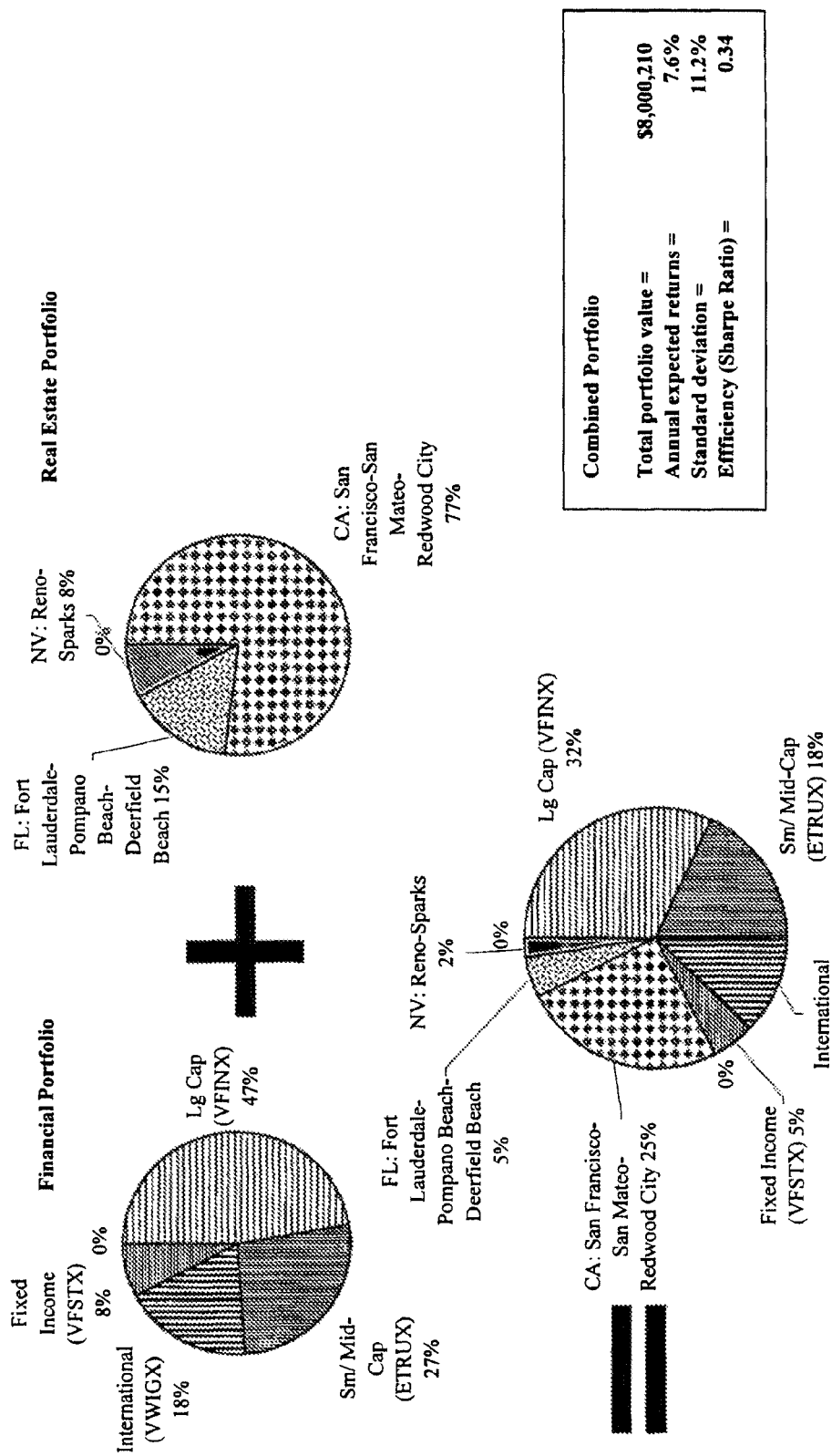
Figure 3A: Baseline Portfolio

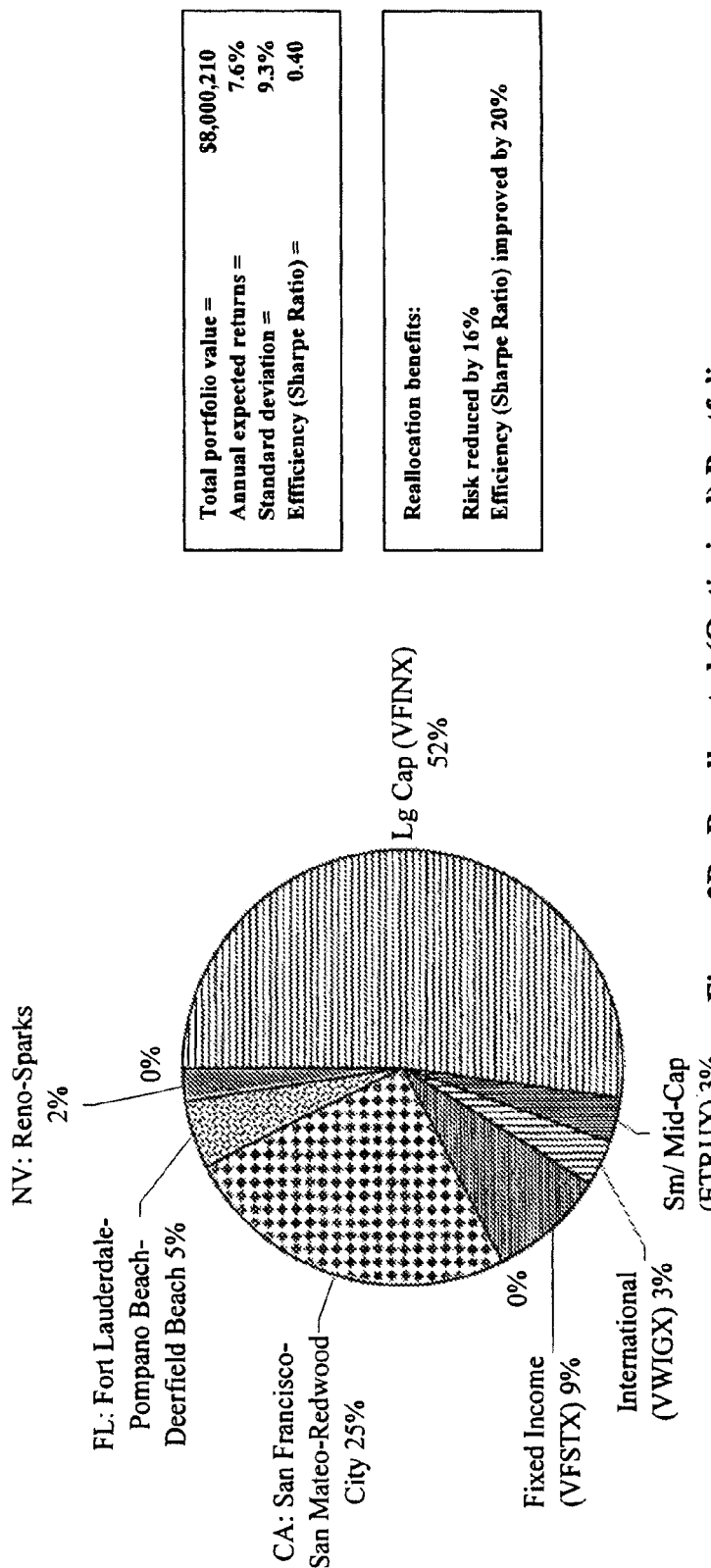
Figure 3B: Re-allocated (Optimized) Portfolio

(501) Investment assumptions and factors

| | | | |
|---|---|---|---|
| MSA= | WY: Cheyenne | Median value date | 2006.75 |
| Property tax= | 0.63% | 25th perc. | 123,273 |
| Income tax rate= | 35% | Median | 178,636 |
| Occupancy= | 11 | Annual finance rate: | 7.5% |
| Occupancy volatility= | 0.05 | Leverage= | 0 |

| | | | | |
|---|---|---|---|---|
| Assumed breakeven leverage: | | | 0.8 | years |
| Depreciation | | | 27.5 | |
| % of property value to depreciate | | | 75% | |
| Maint+insurance+capex= | | | 0.01 | |
| Maint+insurance+capex volatility= | | | 0.5 | |

| (502) date | (503) rent history | (504) interest history | (505) house price history | (506) annual occupied rent | (507) annual property tax | (508) maintenance + insurance + capital investment | (509) annual benefit of depreciation | (510) net rent after financing | (511) income tax after financing | (512) net cash flow after tax & finc'g | (513) annual return (yield) from rents | (514) annual return (yield) from apprec'n | (515) FINAL RESULT: investment yield history |
|---|---|---|---|---|---|---|---|---|---|---|---|---|---|
| 2007.5 | $ 679 | | | | | | | | | | | | |
| 2007.25 | $ 674 | | | | | | | | | | | | |
| 2007 | $ 668 | | | | | | | | | | | | |
| 2006.75 | $ 662 | 7.5% | $ 123,273 | $ 7,285 | $ 776 | $ 1,233 | $ 1,177 | $ 5,276 | $ 670 | $ 4,606 | 3.7% | 15.0% | 18.7% |
| 2006.5 | $ 657 | 7.7% | $ 118,888 | $ 7,223 | $ 748 | $ 1,189 | $ 1,135 | $ 5,286 | $ 715 | $ 4,571 | 3.8% | 0.1% | 4.0% |
| 2006.25 | $ 651 | 7.3% | $ 118,855 | $ 7,164 | $ 748 | $ 1,188 | $ 1,135 | $ 5,227 | $ 695 | $ 4,532 | 3.8% | 10.3% | 14.1% |
| 2006 | $ 646 | 6.9% | $ 115,908 | $ 7,105 | $ 729 | $ 1,159 | $ 1,106 | $ 5,216 | $ 719 | $ 4,497 | 3.9% | 4.6% | 8.4% |
| 2005.75 | $ 641 | 6.4% | $ 114,607 | $ 7,046 | $ 721 | $ 1,146 | $ 1,094 | $ 5,179 | $ 719 | $ 4,460 | 3.9% | 12.1% | 16.0% |
| 2005.5 | $ 635 | 5.9% | $ 111,274 | $ 6,987 | $ 700 | $ 1,113 | $ 1,062 | $ 5,174 | $ 749 | $ 4,425 | 4.0% | 4.8% | 8.8% |
| 2005.25 | $ 657 | 5.8% | $ 109,861 | $ 7,226 | $ 692 | $ 1,100 | $ 1,062 | $ 5,434 | $ 852 | $ 4,582 | 4.0% | 6.6% | 10.8% |
| 2005 | $ 679 | 5.2% | $ 108,183 | $ 7,465 | $ 681 | $ 1,082 | $ 1,050 | $ 5,702 | $ 963 | $ 4,739 | 4.2% | 7.4% | 11.8% |
| 2004.75 | $ 700 | 4.6% | $ 106,222 | $ 7,704 | $ 668 | $ 1,062 | $ 1,033 | $ 5,973 | $ 1,077 | $ 4,897 | 4.4% | 16.5% | 21.1% |
| 2004.5 | $ 722 | 4.6% | $ 102,079 | $ 7,943 | $ 642 | $ 1,021 | $ 1,014 | $ 6,280 | $ 1,224 | $ 5,056 | 4.6% | 8.3% | 13.2% |
| 2004.25 | $ 719 | 3.7% | $ 100,034 | $ 7,910 | $ 629 | $ 1,000 | $ 974 | $ 6,281 | $ 1,243 | $ 5,037 | 5.0% | 11.6% | 16.6% |
| 2004 | $ 716 | 3.8% | $ 97,256 | $ 7,878 | $ 612 | $ 973 | $ 955 | $ 6,293 | $ 1,274 | $ 5,019 | 5.0% | 5.1% | 10.3% |
| 2003.75 | $ 713 | 3.7% | $ 96,034 | $ 7,845 | $ 604 | $ 960 | $ 928 | $ 6,281 | $ 1,282 | $ 4,999 | 5.2% | 7.4% | 12.6% |
| 2003.5 | $ 710 | 3.5% | $ 94,296 | $ 7,813 | $ 593 | $ 943 | $ 917 | $ 6,277 | $ 1,297 | $ 4,980 | 5.2% | 13.7% | 19.0% |
| 2003.25 | $ 705 | 3.7% | $ 91,211 | $ 7,751 | $ 574 | $ 912 | $ 900 | $ 6,265 | $ 1,322 | $ 4,943 | 5.3% | 1.2% | 6.8% |
| 2003 | $ 699 | 4.0% | $ 90,937 | $ 7,689 | $ 572 | $ 909 | $ 871 | $ 6,207 | $ 1,305 | $ 4,903 | 5.4% | 5.3% | 10.7% |
| 2002.75 | $ 693 | 4.2% | $ 89,754 | $ 7,627 | $ 565 | $ 898 | $ 868 | $ 6,165 | $ 1,301 | $ 4,864 | 5.4% | 9.0% | 14.4% |
| 2002.5 | $ 688 | 4.7% | $ 87,800 | $ 7,565 | $ 552 | $ 878 | $ 857 | $ 6,135 | $ 1,309 | $ 4,826 | 5.5% | 1.0% | 6.5% |
| 2002.25 | $ 682 | 5.1% | $ 87,584 | $ 7,506 | $ 551 | $ 876 | $ 836 | $ 6,079 | $ 1,292 | $ 4,787 | 5.5% | 11.5% | 17.0% |
| 2002 | $ 677 | 4.7% | $ 85,166 | $ 7,447 | $ 536 | $ 852 | $ 813 | $ 6,060 | $ 1,308 | $ 4,752 | 5.6% | 0.5% | 6.0% |
| 2001.75 | $ 672 | 5.3% | $ 85,098 | $ 7,388 | $ 535 | $ 851 | $ 812 | $ 6,002 | $ 1,289 | $ 4,713 | 5.5% | 8.1% | 13.6% |
| 2001.5 | $ 666 | 6.1% | $ 83,395 | $ 7,329 | $ 525 | $ 834 | $ 796 | $ 5,970 | $ 1,294 | $ 4,677 | 5.6% | 6.0% | 11.6% |
| 2001.25 | $ 663 | 6.8% | $ 82,180 | $ 7,294 | $ 517 | $ 822 | $ 784 | $ 5,955 | $ 1,300 | $ 4,655 | 5.7% | 3.9% | 9.6% |
| 2001 | $ 660 | 8.1% | $ 81,389 | $ 7,258 | $ 512 | $ 814 | $ 777 | $ 5,932 | $ 1,299 | $ 4,633 | 5.7% | 7.8% | 13.5% |
| 2000.75 | $ 657 | 8.5% | $ 79,853 | $ 7,223 | $ 502 | $ 799 | $ 762 | $ 5,922 | $ 1,310 | $ 4,611 | 5.8% | 1.5% | 7.3% |
| 2000.5 | $ 653 | 8.7% | $ 79,559 | $ 7,187 | $ 501 | $ 796 | $ 758 | $ 5,891 | $ 1,303 | $ 4,589 | 5.8% | 2.6% | 8.4% |
| 2000.25 | $ 650 | 8.7% | $ 78,049 | $ 7,155 | $ 497 | $ 790 | $ 755 | $ 5,867 | $ 1,299 | $ 4,568 | 5.8% | 8.5% | 14.3% |
| 2000 | $ 648 | 8.3% | $ 77,416 | $ 7,123 | $ 487 | $ 774 | $ 739 | $ 5,861 | $ 1,312 | $ 4,549 | 5.9% | 2.0% | 7.8% |

*Figure 5*

Fund design example:

Performance-Matched Mutual Fund (PMMF):

Defined strategy:
- complement real estate property investments in San Francisco
- complement appreciation component only (not debt or property operating expenses)
- design for fund-to-asset match of 50% to 100% (for example, if property value is $1,000,000, investor will invest $500,000-$1,000,000 in the complementary PMMF)

Corresponding "complementary asset class" and corresponding data source
- Asset class: San Francisco MSA
- Value history or index: OFHEO index for San Francisco MSA Proposed stock components for this Performance Matched Mutual Fund:
- LgCap (a large capitalization stock)
- SmCap (a small capitalization stock)
- INTL (an international stock)
- FIX (a fixed income stock)

Figure 6

Fund allocation, pre- and post-complemented allocations, and investor benefits

| (701) Optimal allocation, pre-complement (Baseline Fund) | | Pre-complemented optimal fund allocation | Investment returns | Standard deviation of returns | Sharpe Ratio |
|---|---|---|---|---|---|
| Fund components | LgCap | 47% | 12.0% | 13.3% | 0.68 |
| | SmCap | 27% | 13.0% | 14.4% | 0.69 |
| | INTL | 18% | 11.0% | 12.2% | 0.65 |
| | FIX | 8% | 5.0% | 5.6% | 0.36 |
| (702) Fund total: | | 100% | 11.5% | 12.2% | 0.70 |

| Combined investments, baseline, from investor's standpoint | | Investor holdings | Investment returns | Standard deviation of returns | Sharpe Ratio |
|---|---|---|---|---|---|
| (703) Un-complemented (baseline) fund | Fund total | 50% | 11.5% | 12.2% | 0.70 |
| (704) Investor's property | Real estate in San Francisco | 50% | 5.0% | 5.6% | 0.36 |
| (705) Investor's combined investments, baseline | | 100% | 8.3% | 8.8% | 0.60 |

| Combined investments, optimal allocation using "complemented" method | | Investor holdings | Post-complemented optimal fund allocation | Investment returns | Standard deviation of returns | Sharpe Ratio |
|---|---|---|---|---|---|---|
| (706) Fund components | LgCap | 14.7% | 29.3% | 12.0% | 13.3% | 0.68 |
| | SmCap | 23.9% | 47.8% | 13.0% | 14.4% | 0.69 |
| | INTL | 5.4% | 10.8% | 11.0% | 12.2% | 0.65 |
| | FIX | 6.0% | 12.0% | 5.0% | 5.6% | 0.36 |
| (707) Complementing asset for portfolio optimization | OFHEO index for San Francisco MSA | 50% | | 5.0% | 4.5% | 0.44 |
| (708) Investor's expected combined return, by investing in complemented fund: | | 100.0% | | 8.3% | 8.5% | 0.62 |

| Improved performance from investor's standpoint: | Investment returns | Standard deviation of returns | Sharpe Ratio |
|---|---|---|---|
| | Same | volatility lower by 3% (8.8% to 8.5%) | efficiency improved by 3% (.60 to .62) |

Figure 7

Richmond Investment Residential Real Estate Returns (includes appreciation, rents, net of expenses and financing, based on PortReal index model)
Real Estate Ticker Data Set ticker: RE-RIC.Inv

Note: Real estate analysis is based on estimated values and behavior of real estate owners; data are provided as a convenience for investors

Overview

| | | | |
|---|---|---|---|
| Today's estimated closing value: | 230.15 | Day's Range | N/A |
| Change: | ↑ 3.45 (1.52%) | 52wk Range: | 215.15-232.30 |
| Previous day estimated close: | 226.70 | Volume: | 8.6 M |
| Open: | N/A | Avg Vol (3m) | 5.3 M |
| Bid: | N/A | Market Cap: | 41.09 B |
| Ask: | N/A | P/E (ttm) | 21.0 |
| 1y Target Est. | 239.60 | EPS (ttm): | N/A |
| | | Div & Yield: | 0.09 |

Note: Real estate analysis is based on estimated values and behavior of real estate owners; data are provided as a convenience for investors

Figure 9

Richmond Investment Residential Real Estate Returns (includes appreciation, rents, net of expenses and financing, based on PortReal index model)
Real Estate Ticker Data Set ticker: RE-RIC.Inv

Note: Real estate analysis is based on estimated values and behavior of real estate owners; data are provided as a convenience for investors

Historical prices

| Date | Open | High | Low | Close | Volume | Adj. Close* |
|---|---|---|---|---|---|---|
| 6-Mar-07 | N/A | N/A | N/A | N/A | 8.6 M | 230.15 |
| 5-Mar-07 | N/A | N/A | N/A | N/A | 8.1 M | 230.07 |
| 2-Mar-07 | N/A | N/A | N/A | N/A | 7.3M | 229.98 |
| 1-Mar-07 | N/A | N/A | N/A | N/A | 9.5 M | 229.90 |
| 28-Feb-07 | N/A | N/A | N/A | N/A | 3.2 M | 229.82 |
| 27-Feb-07 | N/A | N/A | N/A | N/A | 5.5 M | 229.74 |
| 26-Feb-07 | N/A | N/A | N/A | N/A | 6.0 M | 229.65 |
| 23-Feb-07 | N/A | N/A | N/A | N/A | 8.8 M | 229.57 |
| 22-Feb-07 | N/A | N/A | N/A | N/A | 4.3 M | 229.49 |
| 21-Feb-07 | N/A | N/A | N/A | N/A | 5.1 M | 229.41 |
| 20-Feb-07 | N/A | N/A | N/A | N/A | 5.2 M | 229.32 |
| 16-Feb-07 | N/A | N/A | N/A | N/A | 2.9 M | 229.24 |
| 15-Feb-07 | N/A | N/A | N/A | N/A | 4.4 M | 229.16 |
| 14-Feb-07 | N/A | N/A | N/A | N/A | 5.5 M | 229.08 |
| 13-Feb-07 | N/A | N/A | N/A | N/A | 6.7 M | 228.99 |
| 12-Feb-07 | N/A | N/A | N/A | N/A | 7.1 M | 228.91 |

*Synthetic investor price based on investment net rental and appreciation yields;

Figure 10

Richmond Investment Residential Real Estate Returns (includes appreciation, rents, net of expenses and financing, based on PortReal index model)
Real Estate Ticker Data Set ticker: RE-RIC.Inv

Note: Real estate analysis is based on estimated values and behavior of real estate owners; data are provided as a convenience for investors

Profile and analyst ratings

Richmond Metropolitan Area
Includes: Richmond City, Henrico County, Chesterfield County, Hanover County, ...
RE-RIC.Inv includes residential single-family homes and multifamily units held by investors for rental income Market Overview

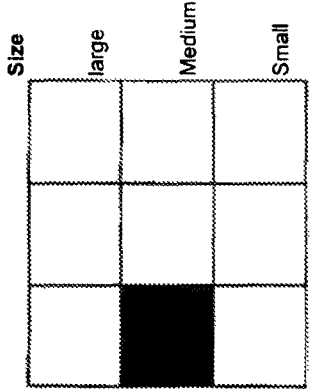

| | Value | Blend | Growth | Investment valuation |

Category: midsize value
year-to-date return: 3.30%
PortReal rating, near term: ★★★★
PortReal rating, long term: ★★★

Figure 11

Richmond Investment Residential Real Estate Returns (includes appreciation, rents, net of expenses and financing, based on PortReal index model)
Real Estate Ticker Data Set ticker: RE-RIC.Inv Note: Real estate analysis is based on estimated values and behavior of real estate owners; data are provided as a convenience for investors

RISK ANALYSIS

Risk overview
PortReal risk rating         Average
Number of years up           23
Number of years down         3
Best 1 yr total return (2005) 15.20%
Worst 1 yr total return (1983) -5.11%

RISK (MODERN PORTFOLIO THEORY) STATISTICS

| Statistic | 3 years | | 5 years | | 10 years | |
|---|---|---|---|---|---|---|
| | RE-RIC.Inv | National | RE-RIC.Inv | National | RE-RIC.Inv | National |
| Alpha (against Standard Index) | -0.12 | -0.22 | -0.10 | -0.18 | -0.11 | -0.16 |
| Beta (against Standard Index) | 0.20 | 0.39 | 0.16 | 0.27 | 0.18 | 0.33 |
| Mean Annual Return | 9.01% | 16.33% | 7.21% | 8.33% | 8.11% | 12.76% |
| R-squared (against Standard Index) | 20 | 39 | 16 | 27 | 18 | 33 |
| Standard Deviation | 5.50% | 7.82% | 4.40% | 8.78% | 4.95% | 8.91% |
| Sharpe Ratio | 0.66 | 0.88 | 0.53 | 0.54 | 0.59 | 0.73 |
| Treynor Ratio | -0.13 | -0.16 | -0.10 | -0.15 | -0.12 | -0.17 |

Figure 12

Richmond Investment Residential Real Estate Returns (includes appreciation, rents, net of expenses and financing, based on PortReal index model)
Real Estate Ticker Data Set ticker: RE-RIC.Inv Note: Real estate analysis is based on estimated values and behavior of real estate owners; data are provided as a convenience for investors

MARKET STABILITY FACTORS

| | Last month | Last 12 months | Last 10 years |
|---|---|---|---|
| Percent homes owned by residents | | | |
| RE-RIC.Inv | n/a | 33% | 31% |
| US median MSA | n/a | 31% | 28% |
| Foreclosure rate | | | |
| RE-RIC.Inv | 1.30% | 1.10% | 0.90% |
| US median MSA | 1.50% | 1.18% | 1.05% |
| Building permits/ net population growth | | | |
| RE-RIC.Inv | 60% | 55% | 47% |
| US median MSA | 68% | 56% | 50% |
| Days on market | | | |
| RE-RIC.Inv | 44 | 37 | 25 |
| US median MSA | 49 | 38 | 35 |

Figure 13

FUND FOR HEDGING REAL ESTATE OWNERSHIP RISK USING FINANCIAL PORTFOLIO THEORY AND DATA FEED FOR ANALYZING THE FINANCIAL PERFORMANCE OF A PORTFOLIO THAT INCLUDES REAL ESTATE

CROSS REFERENCE TO RELATED APPLICATIONS

This application is a continuation of U.S. patent application Ser. No. 11/716,823 filed Mar. 12, 2007 entitled "Fund for Hedging Real Estate Ownership Risk Using Financial Portfolio Theory and Data Feed for Analyzing the Financial Performance of a Portfolio that Includes Real Estate", now U.S. Pat. No. 7,970,684, which is a continuation in part of U.S. patent application Ser. No. 11/589,631 file Oct. 30, 2006 entitled "Tool For Hedging Real Estate Ownership Risk Using Financial Portfolio Theory And Hedonic Modeling," now U.S. Pat. No. 7,822,668, which claims the benefit of U.S. provisional application Ser. No. 60/731,829 filed on Oct. 31, 2005 entitled "Tool For Hedging Real Estate Ownership Risk Using Financial Portfolio Theory And Hedonic Modeling." U.S. patent application Ser. No. 11/716,823 also claims priority to U.S. provisional application Ser. No. 60/781,798 filed on Mar. 13, 2006 entitled "Investment Products and Investment Data Feeds." The entire contents of all such prior applications are hereby incorporated herein by reference.

FIELD OF THE INVENTION

The present invention relates to a system and method for hedging real estate ownership risk.

BACKGROUND OF THE INVENTION

Modern Portfolio Theory (MPT), developed in the 1950s by Nobel Prize Winner Markowitz, illustrates that a portfolio of assets has different risk characteristics than the simple sum of the risks of the individual assets. Though risk can be defined in many ways, the example of MPT serves to identify a general matter of concern to investors. Under MPT, risk is defined as the standard deviation (or, alternatively the variance) on the period-to-period returns of an asset. For example, a stock with an expected return of 12% per year, and volatility expressed as a standard deviation of 15%, is expected to have returns within one standard deviation (about 68% of the time) between 12+15=27% and 12−15=−3% in any year. When numerous assets are combined in a portfolio, these standard deviations cannot simply be added up. Typically, the assets are somewhat uncorrelated, so as group, the volatilities of individual assets counteract each other, in a manner known as risk diversification. Although the long-term, average expected returns for each asset do sum up for the portfolio, the volatility of these returns will result in actual returns of some assets to increase above the expected rate, and to decrease below the expected rate for other assets, for any period of time. The combined effect is a portfolio return that has lower volatility than that of the individual returns, while the expected year-to-year return (i.e., rate of growth) remains the same.

The general principles of portfolio diversification assist in identifying a mix of assets that generate the highest expected returns at the lowest portfolio risk. Portfolio risk can be minimized by selecting assets whose volatilities are less correlated. Portfolio returns are defined by the individual expected returns of the assets. Using commercially available optimization software, one can allocate the mix of certain liquid assets (e.g., stocks, bonds, etc.) in a portfolio to achieve optimal performance, where "optimal" is typically defined as some combination of objectives for the volatility and returns of the portfolio.

Privately owned residential real estate comprises roughly $20 trillion of US wealth. By and large, this investment is not managed from a portfolio allocation standpoint, and is not accounted for in private and institutional portfolios using explicit quantitative methods of portfolio diversification. In this context, "explicit" and "quantitative" imply that asset allocations in a portfolio are based on calculations using time series histories of value and rent income data for real estate properties.

SUMMARY OF THE INVENTION

The present invention applies asset allocation to a portfolio that contains tangible real estate assets or assets whose value is derived from real estate. The invention solves several classes of problems not currently addressed in the investment community: (1) Explicitly including tangible residential real estate into the asset allocation analysis for private wealth portfolios. Today, if tangible real estate holdings are modeled at all, they are modeled with proxies such as REIT indexes or the CPI index. (2) Using other, more liquid assets in the portfolio, such as financial assets, to offset risks associated with the tangible real estate assets. Transacting real estate is expensive and time-consuming, and real estate markets are not dynamic compared to financial markets. For example, financial exchanges can execute transactions in seconds, at costs of less than 1%, while real estate transaction cycles typically last weeks and sales commissions are frequently as high as 6%. Therefore, investors are less likely to reallocate their portfolios by buying and selling real estate properties. However, those investors whose portfolios contain tangible real estate can reallocate the proportions of their financial assets in such a way that the mix of financial assets better complements the real estate assets in terms of overall portfolio risk (volatility) and return. (3) Using hedonic modeling to characterize value drivers that contribute to tangible real estate values in order to assess the role of these value drivers in overall portfolio risk (volatility) and returns. One application of the invention is to help an investor to assess the contribution of a component of total property value, such as land value, to total risk (volatility) and returns of the overall investment portfolio. (4) Using these methods to evaluate risk and return of portfolios of investment assets (such as REITs, insurance liabilities, or mortgage assets held by a mortgage company) whose value is related to discrete real estate assets.

The present invention demonstrates how both economic returns from real estate value appreciation and from cash flows (such as rent) can be incorporated into a portfolio allocation model. The method also outlines a method for disaggregating the value of real estate properties into components called value drivers, which can then be treated as virtual assets due to the fact that these value drivers have unique statistical characteristics which affect overall portfolio risks and returns differently from the property as a whole, and therefore should in some cases be accounted for independently. Such analysis permits portfolio analysts to select assets that best complement certain real estate holdings, or to select real estate investments with certain value driver characteristics that best complement other assets in the portfolio. The technique can also be used to reduce risk in a composite portfolio that contains real estate along with other assets in a way to offset or hedge risk associated with the real estate holdings by changing the mix of the other investment assets. Therefore, portfolios that contain assets with restricted liquidity (such as a real estate property) can still be optimized for risk and return by reallocating the other assets in the portfolio to complement the non-liquid assets for greater diversification and/or higher returns.

In the context of this invention, "risk" and "volatility" are used interchangeably. Risk is a statistical characterization of the unpredictability of returns. It is commonly calculated using the standard deviation (or the variance) of the period-to-period returns of the value of an asset. However, other forms of statistical characterization also exist, including "downside risk" calculations. Risk estimators may derive from both historical values and cash flows associated with the investment (i.e., investment-specific information) as well as external market and macroeconomic factors such as, but not limited to: interest rates, regional demographic trends, foreclosure rates and trends, indicators of overbuilding, and the percent of property-related financing held by subprime borrowers. Examples cited herein will use standard deviation (or its square, the variance) because it is a common and well-understood formulation for risk. However, it will be appreciated by those skilled in the art that these other statistical formulations for risk apply to the methods described herein.

The present invention applies this method to portfolios containing assets or liabilities whose value is determined, at least partly, by discrete real estate assets or categories of assets. For example, a mortgage company's portfolio of mortgages is secured by the value of discrete properties. The risk of the portfolio, and its value, depends in part on the risk and value of the individual properties secured by the mortgages, as well as the interaction of the values of these assets from a diversification standpoint.

In one embodiment, the present invention is directed to a method for creating an investment fund and selling shares in the fund to individual investors that hold direct real estate investments outside of the fund, wherein the fund is selected from the group consisting of a mutual fund, index fund, or exchange-traded fund (ETF). Each of the individual investors has an investment ratio defined by a dollar amount of direct real estate investments held by the investor outside of the fund divided by a dollar amount of shares in the fund held by the individual investor. A target range of the investment ratio is selected for the fund. A target geographical region is selected where individual investors in the fund hold the direct real estate investments. A model composite portfolio is identified for the individual investors in the fund. The model composite portfolio is an asset combination that includes: (i) direct real estate investment held by an individual investor in the target geographical region, and (ii) shares in the fund held by the individual investor. The asset combination in the model composite portfolio has an investment ratio that is within the target range. An optimal fund asset allocation is selected for the composite model portfolio in order to diversify and/or hedge risks associated with the direct real estate investment held by the model composite portfolio. Selection of the fund asset allocation is performed by treating assets corresponding to the shares in the fund held by the model composite portfolio as variable assets, treating the direct real estate investment held by the model composite portfolio as a non-variable asset, and calculating a mix of the variable assets that maximizes expected returns for the composite model portfolio while minimizing risks for the composite model portfolio, subject to optimization constraints that reflect the investment objectives of the fund designer or the investor. These may include constraints on the composition of the fund or maximum/minimum limits on returns or risk. The risks for the composite model portfolio correspond to a variance or other statistical characterization of the returns for the composite model portfolio over a plurality of discrete time periods. The risks for the composite model portfolio depend upon risks associated with the variable and non-variable assets in the composite model portfolio and a mutual correlation of the risks associated with the variable and non-variable assets. The expected returns for the composite model portfolio correspond to a combination of capital gains and ongoing income that each asset in the composite model portfolio is projected to generate, expressed as an average value over a range of time periods. Shares of the fund are sold to individual investors that hold direct real estate investments in the target geographic region and have investment ratios in the target range.

In particular embodiments, a target type of direct real estate investments (e.g., rental properties and owner occupied residential real estate) held by the individual investors is selected for the fund, and the model composite portfolio is an asset combination that includes: (i) direct real estate investment of the target type held by an individual investor in the target geographical region, and (ii) shares in the fund held by the individual investor.

In other embodiments, a target real estate class type (e.g., a particular number or range of bedrooms, detached, multi-unit, suburban or urban) of direct real estate investments held by the individual investors is selected for the fund, and the model composite portfolio is an asset combination that includes: (i) direct real estate investment of the target real estate class type held by an individual investor in the target geographical region, and (ii) shares in the fund held by the individual investor.

In still other embodiments, a target financing range and target financing class type associated with the direct real estate investments held by the individual investors is selected for the fund. The target financing range corresponds to a percentage range of value in the direct real estate investment which is subject to financing. The target financing class type entails specifying terms or features of the financing vehicle: whether fixed or variable rates, a range of effective interest rates, and so on. In such embodiments, the model composite portfolio is an asset combination that includes: (i) direct real estate investment having financing within the target financing range and target financing class type and held by an individual investor in the target geographical region, and (ii) shares in the fund held by the individual investor.

In still further embodiments, the risks for the model composite portfolio correspond at least in part to a symmetric formulation (e.g., standard deviation) of the returns for the composite model portfolio over the plurality of discrete time periods, or a non-symmetric formulation of the returns for the composite model portfolio over the plurality of discrete time periods (the non-symmetric formulation may be used to account for downside risk.) In addition, the risks for the composite model portfolio correspond at least in part to a variance or other statistical characterization of historical values and estimated or actual cash flows of assets in the composite model portfolio, as well as one or more external factors such as macroeconomic factors (e.g., interest rates), demographics (e.g., population and wealth growth), construction and housing trends (e.g., housing capacity, costs of construction), and ownership and financing trends (e.g., foreclosure rates, degree of lending to investors and homeowners with subprime credit ratings, ownership tenure).

In accordance with a further aspect, the present invention is directed to a method for assessing the financial performance of an investment portfolio that includes real estate. Data representative of at least returns from rents and returns from appreciation for real estate in a defined geographic area are applied to a financial model in order to generate a composite rental return index for real estate in the defined geographic region. The composite rental return index is used to assess the financial performance of the investment portfolio. In some embodiments, data representative of financing costs for real estate in the defined geographic area is also applied to the financial model in order to generate the composite rental return index for real estate in the defined geographic region. In still further embodiments, data representative of historical tax rates, cost of construction, fluctuations in vacancy rates, or historical insurance rates for real estate in the defined geographic area may be applied to the financial model in order to generate the composite rental return index for real estate in the defined geographic region. In still further embodiments, the composite rental return index may be represented as an exchange-traded asset, e.g., with a ticker symbol, and/or distributed in real time on an interactive website.

BRIEF DESCRIPTION OF THE DRAWINGS

FIG. 3A is a diagram illustrating an original asset allocation of a user.

FIG. 3B is a diagram illustrating an optimized asset allocation of the user.

FIG. 5 is a diagram illustrating the calculation of an exemplary composite rental return index for real estate in the defined geographic region, in accordance with one embodiment of the invention;

FIG. 6 illustrates aspects of an exemplary fund design, in accordance with one embodiment of the invention;

FIG. 7 illustrates the selection of an optimal fund asset allocation for a composite model portfolio that diversifies and hedges risks associated with the direct real estate investment held by the model composite portfolio, in accordance with an example of one embodiment;

FIG. 9 illustrates exemplary daily market information distributed in connection with a real estate ticker data set, in accordance with one embodiment of the invention;

FIG. 10 illustrates exemplary historical market information distributed in connection with a real estate ticker data set, in accordance with one embodiment of the invention;

FIG. 11 illustrates an exemplary market overview distributed in connection with a real estate ticker data set, in accordance with one embodiment of the invention;

FIG. 12 illustrates exemplary risk analysis and statistics distributed in connection with a real estate ticker data set, in accordance with one embodiment of the invention;

FIG. 13 illustrates exemplary market stability information distributed in connection with a real estate ticker data set, in accordance with one embodiment of the invention.

DETAILED DESCRIPTION OF THE INVENTION

Figure 1:
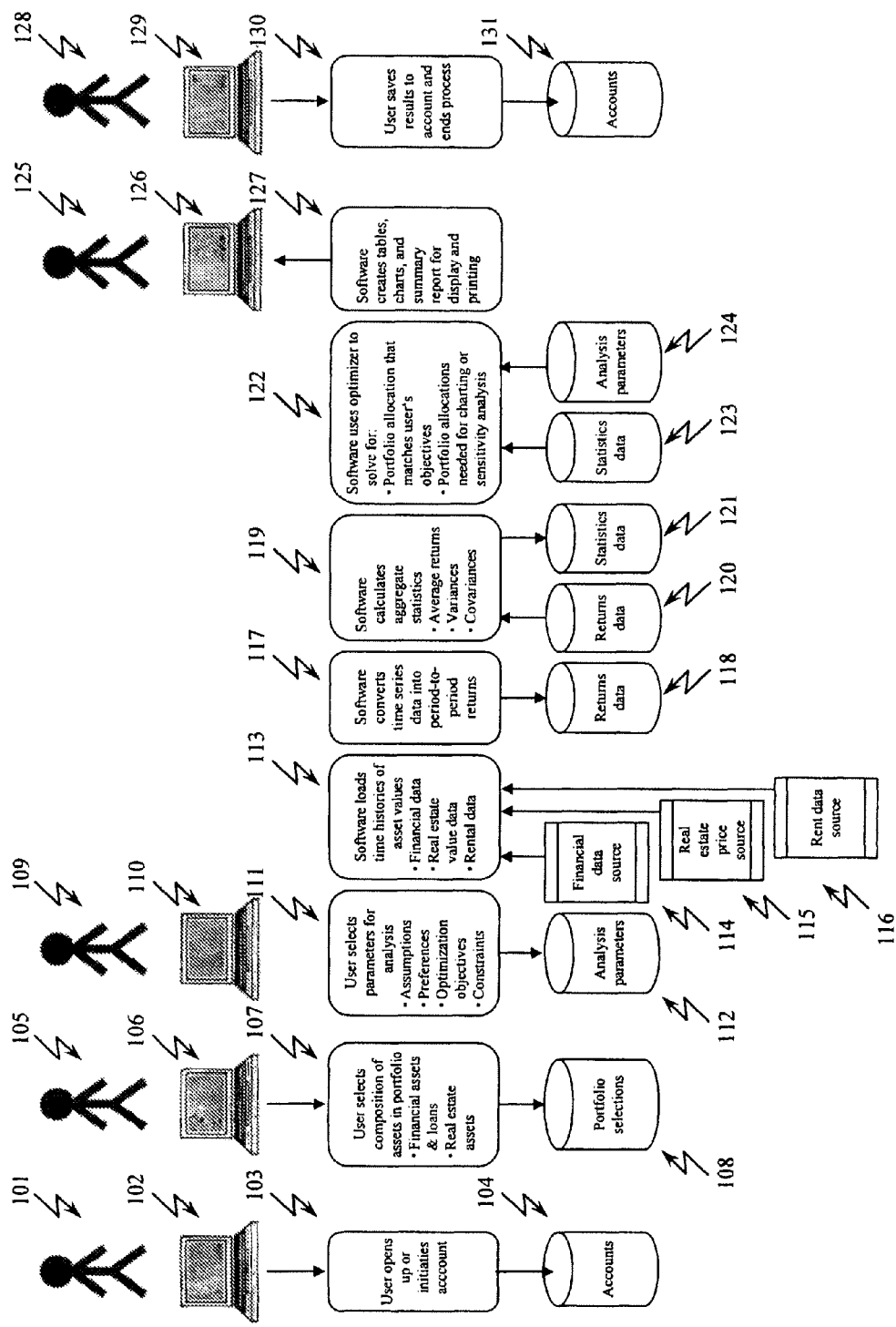
FIG. 1 is a schematic diagram illustrating a first embodiment of the invention.

The implementation of one embodiment of the invention is illustrated by the system in FIG. 1. Item 101 (also designated 105, 109, 125 and 128) represents the user, who may be a person or a computer that interacts with the system depicted in FIG. 1. This user interacts with the system through a computer interface, shown as item 102 (also designated 106, 110, 126, 129). Item 103 is a software process through which the user initiates a new account, or opens an existing account. The use of an account provides continuity for a user who may use the system repeatedly over time. Account information is stored in an account database, item 104 (also designated 131), which may also be used to save portfolio information and analytical results.

Item 107 is the process by which the user selects the assets that make up the portfolio. These asset selections may include: traditional financial investments, such as stocks and bonds; financial indices (such as an S&P500 index) as a proxy for the values of asset holdings; debt obligations such as mortgages; and tangible real estate assets (e.g., residential real estate held by the user including, for example, the user's primary residence). In one embodiment, the assets that make up the portfolio include "variable" and "non-variable" assets. For purposes of this application, "variable" assets are those assets whose allocations are varied during the optimization process (described below); and "non-variable assets" are those assets whose allocation remains fixed during the optimization process. In some embodiments, real estate assets (such as the user's primary residence and any encumbrances thereon) are treated as non-variable assets. All of the asset selections are represented by a time series of values in the form of an index. "Index", in this case, refers to stating the value of an asset, over time, in the form: "the value of $1 invested in this asset at time X(0) is worth X(n) at some period n". These selections are saved to a table or database, marked as item 108.

Item 109 is the user who interacts through interface 110 with process 111 to select parameters for the subsequent calculations. These parameters include: (1) assumptions, such as an appropriate span of time for the time series to be used in calculations; (2) preferences, largely regarding charting and form of output; (3) optimization objectives, which may take forms such as "maximize returns", or "minimize risk at risk level X"; (4) constraints, which set limits on the range of possible solutions to the optimization calculation; an example of such a constraint is: "the first asset may not comprise more than 15% of the total value of the optimized portfolio". These parameters are stored in a table or tables designated 112 (also designated 124).

Item 113 represents the process whereby the software imports, or loads, time series data corresponding to the assets selected for the portfolio in step 107. As defined above, the time series values must be in the form of an index. These time series are available from $3^{rd}$ party sources (e.g., finance.yahoo.com, Bloomberg, and Morningstar for financial assets; OFHEO for residential real estate, and HUD for rents), and may require normalization and synchronization using techniques common to a practitioner, in order to ensure consistency in subsequent calculations. For example, it might be advisable to convert all data to a monthly basis, even though some data may be available on a daily basis.

There are many methods of calculating returns, risks, and the interaction of assets in a portfolio. The simplest case, as described by Modern Portfolio Theory, is presented below to describe steps 117 through 127. This method provides a general framework from which other techniques may be derived.

Item 117 represents the process by which the index data are converted into period-to-period returns using the following equation:

$$((\text{index value at period } n)/(\text{index value at period } n-1)-1) \quad (1)$$

These period-specific returns are saved to the returns data table, marked as item 118 (also designated 120).

Item 119 represents the calculation for converting returns data into statistics used in the optimization calculations. There are two calculations: "average returns" and "variances/covariances", also known as the "varcovar" matrix. For a given time period, such as Jan. 1, 1990 to Dec. 31, 2005, the average returns are the average of all returns for each period during this period. The varcovar matrix is the matrix comprising the variances and covariances of returns among all of the assets in the portfolio. Each element varcovar(i,j) of the matrix is the covariance of asset i with asset j. When i=j, the term is the variance of the asset. The process in item 119 imports values from the returns data table (item 120) and places the results of the calculations into one or more tables referred to as the statistics data table (item 121, also designated 123). As a minimum, the statistics data table should include average returns for all assets, and a varcovar matrix.

Step 122 relies on the use of an optimization algorithm, or a solver, which may be procured commercially (e.g., Solver from Frontline Systems and Matlab from Mathworks). In the context of this patent application, we use the term "solver" and "optimizer" interchangeably. Step 122 sets up an objective function, sets up constraints, and calls on the optimization algorithm to solve for an "optimal solution" within some limits of computational accuracy. Step 123 draws on the previously calculated statistics data, shown in item 123, and on the user's selected analysis parameters, selected in step 111 and shown in item 124.

Step 122 defines a variable array called W to represent the weight of each asset as a percent of the value of the total portfolio. For example, if asset 1 is an equity with a final allocated value of $150,000, and the total portfolio value is $1,000,000, then W(1)=15%. Values of W(i) will be varied by the solver until it identifies those values of W(i) that optimize the objective function. Furthermore, since the total allocation of all assets must be 100%, step 122 imposes the constraint that the sum of all W(i) must equal 100%. The investor may set other constraints, including maximum and minimum limits on the allocations of individual assets.

Step 122 also defines an array called R which comprises the average returns of each asset calculated in step 119. If the asset 1 is has had an average year-to-year return of 12%, then R(1)=12%. Step 122 also defines an array V which comprises the values of the varcovar calculations performed in step 119. Step 122 also defines arrays called Wmin and Wmax, which set the constraints on the weights of each asset as a percent of total value of the portfolio. For example, for an unfinanced portfolio (no mortgages), and not allowing assets to be sold short, Wmin(i) will be no less than 0% for all assets i, and Wmax(i) will be no more than 100% for all assets i. These constraints may be modified with user input in step 111 and provided in the analysis parameters table (item 124).

Step 122 calculates the portfolio return, Rp, as the weighted average return of all assets, or the matrix multiplication of the transpose of W, and R ($Rp=W^TR$). Step 122 calculates the portfolio variance, Vp, as the matrix multiplication of the transpose of W and the matrix multiplication of V and W ($Vp=W^TVW$).

Next, step 122 defines an objective function based on the user's selection in step 111. This objective function will be expressed as some combination of risk (portfolio variance) and returns (portfolio return). A typical objective function is "maximize Rp at Vp such that sqrt(Vp)=10%", or "maximize the Sharpe Ratio=(Rp-RD/sqrt(Vp))", where Rf is a user-defined reference rate of return.

Step 122 then calls upon the optimizer to find an allocation of asset weights W(i) within constraints Wmin(i) and Wmax(i) that achieves the objective function within acceptable limits of computational accuracy.

Finally, depending on the needs of user, the algorithm in step 122 can be iterated to calculate portfolio variances and returns over a range of values. For example, the "efficient frontier" represents maximum portfolio returns over a range of variances. Iteration over a range of values may serve different purposes, including creating a plottable data set or to generate points for a sensitivity analysis.

Steps 125-127 depict the process whereby the user interacts with the system to view results from the analysis. FIG. 3A depicts the user's original portfolio asset allocation input into the system of FIG. 1, shown as three pie charts: financial assets, real estate assets, and combined portfolio of all assets. FIG. 3B depicts the user's optimized portfolio asset allocation as calculated by the system of FIG. 1. In both diagrams, the real estate portion of the portfolio has the same allocation percentage (because this portion of the portfolio was treated as non-variable in the analysis). However, the remaining (variable) portion of the portfolio has been optimized to hedge the risks associated with the non-variable portion of the portfolio. Steps 128-130 depict the process whereby the user closes out the process, and saves results to the accounts data table 131 in step 130.

Referring again to step 107, in one embodiment the user will have the option to select from among one or several lending rates and loan types. This step may be used to input information about mortgages encumbering the user's real estate (as well as other debt) into the system. In step 107, the software applies a negative sign to loans, which converts the weight to a negative percentage. The total of the weights of all assets must remain 100%. This is the same constraint described in reference to step 122 above. For adjustable mortgages based on an index value plus a margin, step 117 must add the margin to the index imported in step 113. The approximate impact of caps and ceilings may be accounted for by adjusting the average returns, variances and covariances in step 119. For example, caps tend to reduce volatility and this can be approximated by adjusting the calculated variance for the index, either by manual corrections or a mathematical equation. To test which mortgage option (i.e., margin+index combination) creates the optimal portfolio outcome, step 122 must iterate through each of the financing options, analogous to the iteration process described below. This method can be further enhanced by setting constraints on the portfolio weight of the mortgage that let the optimizer find the optimal amount of financing.

In a further embodiment of step 107 where the user's real estate investments are treated as variable assets, the user selects all possible candidates of real estate investments, and the monetary value of the investment to be made in that asset should that be the selected asset. Step 111 is modified to allow the user to select an option that sets up step 122 in the method so that the method will optimize the portfolio with constraints set such that only one of the real estate assets can be included in the portfolio, and only then, at the monetary value assigned by the user in step 107. Step 122 must be modified to perform this optimal allocation analysis. Using integer variables in the optimization analysis is one method for accomplishing the testing and selection of the real estate investment asset in step 122. Another method uses an iterative process whereby each real estate investment asset is successively tested in the portfolio by optimizing the portfolio with that asset included. The final selection is that real estate investment that results in an optimal solution that is superior to optimal solutions corresponding to any other real estate investment.

Figure 2:
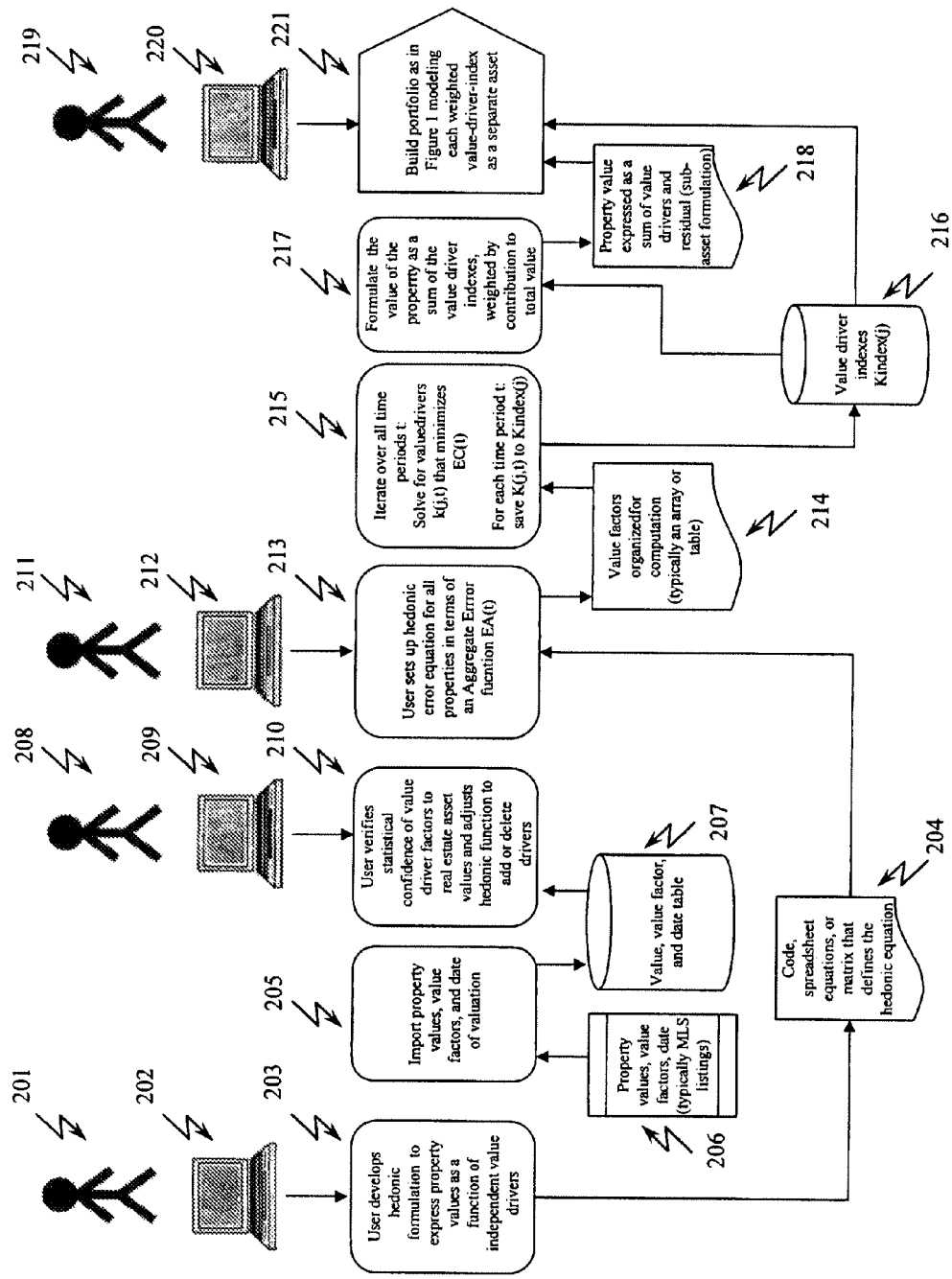
FIG. 2 is a schematic diagram illustrating a second embodiment of the invention.

In accordance with a further aspect, methods for asset allocation based on hedonic modeling are used in connection with the optimization process. The asset allocation is calculated on the basis of sub-assets whose values make up the total value of an actual asset. Each sub-asset corresponds to a value-driver of the asset. A simple, conceptual example is the valuation of a residential property based on the sum of the value of the land (the acreage of the lot) and the structure (construction cost). The land and the structure are each sub-assets, whose summed value is the value of the asset. Sub-assets do not need to correspond to discrete components of the property. For example, the value of the style of the property can be a sub-asset, and may be quantified by a binary factor such as "1" for "colonial style" and "0" for any other style. Properties with colonial style may have a sub-asset value corresponding to "style" that is substantially different for a colonial building vs. any other building. The method described below and in FIG. 2 is simplified in order to illustrate the method, but can be extended to various formulations. For example, the mathematical formulation is linear, while the general approach can include non-linear expressions for the value drivers.

A hedonic model is a mathematical equation that estimates the value of a real estate property based on a number of factors corresponding to features of the property, and coefficients of those factors. The coefficients may be calculated by various methods. In this example, without loss of generality, we assume the use of a commercially available solver algorithm (e.g., Solver from Frontline Systems and Matlab from Mathworks). This algorithm is used to determine values for the coefficients that provide the best fit of the mathematical equation across a set of reference real estate properties. For example, one might choose to fit a hedonic model to all houses in a given neighborhood. For each house "i", at some time "t", there is an error $E(i,t)$ that corresponds to the market value of that house and the estimated (hedonic) value of the house based on the hedonic model, $Vhed(i,t)$:

$$E(i,t)=V(i,t)-Vhed(i,t) \quad (2)$$

In its simplest form, the hedonic model is a linear function comprising the sum of value drivers, $VD(i,j,t)$, where: $VD(i,j,t)$ is the value driver, or the value of the sub-asset; i designates the real estate property, j designates the sub-asset (e.g., "land value", or "construction cost"), and t designates the time at which the calculation applies. Mathematically:

$$Vhed(i,t)=\Sigma[\text{for all } j](VD(i,j,t)) \quad (3)$$

Again, in simplest form, value drivers can be expressed as the product of a value coefficient $K(j,t)$ multiplied times a value factor $F(i,j)$.

$$VD(i,j,t)=K(j,t)\times F(i,j) \quad (4)$$

In the example used above, $VD(i,l,t)$ could refer to the sub-asset "property value", and the value coefficient $K(l,t)$ would be the price per acre, and the value coefficient $F(i,l)$ would be the acreage of the lot.

The estimate error for each property is therefore:

$$E(i,t)=V(i,t)-\Sigma[\text{for all } j](K(j,t)\times F(i,j)) \quad (5)$$

The best-fit hedonic model is one which minimizes the errors $E(i,t)$ across the entire population of properties. The aggregate error across the entire set of properties, $EA(t)$, may be expressed in many ways. One simple formulation is:

$$EA(t)=\text{square root of } (\Sigma[\text{for all } i](E(i,t))) \quad (6)$$

The optimizer is used to minimize the objective function (6) within a user-specified tolerance, by solving for $K(j,t)$. The user may also apply constraints to the optimization (for example, "value per acre must be positive"). Building on the previous example, such a process might determine that housing prices in a particular neighborhood are primarily determined by two factors: land value, based on acreage at some average cost/acre, and construction cost based on house size at some average construction cost per square foot.

FIG. 2 illustrates the implementation of the algorithm described above. User 201 works through interface 202 to define the hedonic equations for real estate valuation in step 203. In the simplest form, the output of this step is a set of equations in programming code, or equations in a spreadsheet, or a table that the software in step 213 will use to identify those value factors to be used in the hedonic model. The output from step 203 is stored in some medium represented by item 204, and will subsequently be pasted into, or accessed by, the hedonic model in step 213. Examples of factors for the hedonic model include physical features of the real estate property investment, type of structure, types of amenities accessible but not included; structure of mortgage or ownership; location of the real estate property investment; proximity of the real estate property investment to attractions, places of work, transportation routes, or nuisances; access to schools and services associated with the real estate property investment; applicable rules, covenants, restrictions, regulations, laws and tax structure; community controls; architectural and historical controls; factors relating to cost of ownership including community dues, taxes, various utility costs or insurance costs; costs or risks associated with region-specific atmospheric, environmental, or geological phenomena; category-specific macroeconomic and economic factors such as regional unemployment, category-specific mortgage rates, and regional available housing inventory stocks; and business performance of local employers who influence local job markets.

Step 205 is the importation of value factors, property values, and date of the valuation, from a $3^{rd}$ party source, 206. Typically, this source will be a realty organization's Multiple Listing Services database, or county real estate records; other sources or aggregated sources may be used, For example, NILS data may be cross-referenced with geographical features to create a new set of value factors such as "distance from train station". The value factors are expressed as property-specific data in quantitative terms such as "square foot of structure", "acreage", "number of bedrooms", or other data representative of the other factors (such as those described in the preceding paragraph) that may be the subject of the hedonic model. The property values will be sales price, appraised price, or some other estimate of market price for the property at some date. Step 205 may import either all value factors, or only those specified in 204 (the table or other medium that specifies the value factors). The data are organized into tables for processing by the hedonic model and stored in a table 207.

The user, 208, uses interface 209, to run statistical tests on the value factors (stored in table 207) in step 210 to establish confidence that there is a statistical relationship (such as a correlation) between the value factors and property values. Such tests can be used to eliminate or select value factors, and to redesign the hedonic formulation in step 203. For example, the user may determine that the relationship between a specific value factor and property value is non-linear, and would adjust the equations in 204 accordingly by revising step 203.

The user, 211, uses interface 212, to import or integrate the value factors 204 into the hedonic model in step 213. For example, if the hedonic model is in the form of a spreadsheet, the user copies a cell (or cells) stored in 204 and pastes it into the hedonic model spreadsheet (214) in step 213. In step 213, the equation in the copied cell is applied to all real estate properties, so the formula in the cell(s) would be pasted into an array of cells corresponding to the range of real estate properties. In other words, if there are 1000 properties, the hedonic equation developed in step 203 would be copied into 1000 cells, each cell corresponding to a property. The individual hedonic equations are in the form of equation (5) above, and the Aggregate Error function, equation (6), is either part of the software or coded in by the user. The Aggregate Error function (equation (6)) becomes the objective function for the optimizer in step 215. The output of step 213 is a table or spreadsheet, 214, which organizes hedonic equations for each property in terms of a set of hedonic factors, $K(j,t)$, which can be manipulated by the solver in step 215, and declares the Aggregate Error function $EA(t)$ as the objective function for optimization.

In step 215, the hedonic model then solves for Value Coefficients, $K(j,t)$, that minimize the Aggregate Error function (6), for a time period t. For example, the hedonic model solves for a common set of value coefficients $K(j,1990)$ that correspond to all properties for which there are market values during the year 1990. By iterating through a range of time increments, t, the solver creates a time dependent series of value coefficients, $K(j,t)$, which are designated by the arrays Kindex(j). For example, the time-iterated hedonic model in step 215 could iterate through a range of years, 1990 through 2005, by solving for $K(j,1990)$, then $K(j,1991)$, and so on, through $K(j,2005)$, in order to create time series for Kindex (1), Kindex(2), etc. A representative output would be value coefficients equivalent to: "land is valued at $x/acre in year y", or "construction cost is $x/square foot in year y", for a range of years "y". The output of the value coefficient time series data is saved into table 216.

It will be appreciated by those skilled in the art that the method above, applied to a single property, can be extended to create hedonic models for categories of similar properties.

In step 217, the software (or manual intervention from a user) converts the value of a specific property or category of properties into sub-assets, whose value is expressed by each term in the hedonic equation. Equation (4) expresses the value of each sub-asset, j, corresponding to a property or category i. As an example, the value of townhouses in some region may be expressed in terms of sub-assets such as "cost of structure related to square feet" and "location related to miles from downtown". Since the hedonic value drivers for each sub-asset will not necessarily sum up to the total value of the property, there will be a residual term, $R(i,t)$, that accounts for other components of the value of the property. $R(i,t)$ is calculated as:

$$R(i,t)=V(i,t)-\Sigma[\text{for all }j](K(j,t)\times F(i,j)) \quad (7)$$

This residual is mathematically equivalent to the hedonic error equation, (5).

Thus, the value of the property can be expressed as a sum of the values of sub-assets:

$$\text{Value=value of sub-asset 1+value of sub-asset 2+ . . . +residual} \quad (8)$$

Or:

$$V(i,t)=\Sigma[\text{for all }j](K(j,t)\times F(i,j))+R(i,t) \quad (9)$$

And each sub-asset is valued as:

Value of sub-asset 1 for property $i=K(1,t)\times F(i,1)$

Value of sub-asset 2 for property $i=K(2,t)\times F(i,2)$

Value of the residual sub-asset for property $i=R(i,t)$. (10)

This formulation for the values of the sub-assets is stored as code, spreadsheet cells, or an array in some medium, 218.

In step 221, the user, 219, uses interface 220, to launch the method described in FIG. 1, defining the investment property or category in the portfolio in terms of the sub-assets, equation (7). For example, the portfolio might contain land assets as well as residential properties. The land assets could be modeled in the portfolio allocation using a simple index for land values, but the residential properties could then be modeled as a set of sub-assets, thus the portfolio can be a blend of assets and sub-assets. In step 221, the user also must define optimization constraints for the sub-assets such that the sub-assets are constrained to sum to the total value of the property. For example, if a residential property is valued at $500,000, and the land is valued at $200,000, the structure is valued at $200,000, then the residual must be set to $100,000 in order to total $500,000. These asset values represent the distribution of actual values of assets and sub-assets within the investor's portfolio. By contrast, the indexes Kindex(j) are used to calculate the statistical expected returns and risk (volatility) of these values.

The method outlined above, and described in FIG. 2, can be extended to account for income streams (value creation) associated with rents or other cash flows. The method can also be extended to categories of investments. For example, the sub-assets "land value" and "construction costs" can be formulated for a category of properties held in a portfolio, such as "residential 2 bedroom homes on small lots". Further, this method can be extended to real-estate-derived assets or liabilities in a portfolio. For example, a portfolio of holdings by a REIT could be modeled in terms of the categories of direct investments in properties, or inventories held by the companies in which it has invested.

Figure 4:
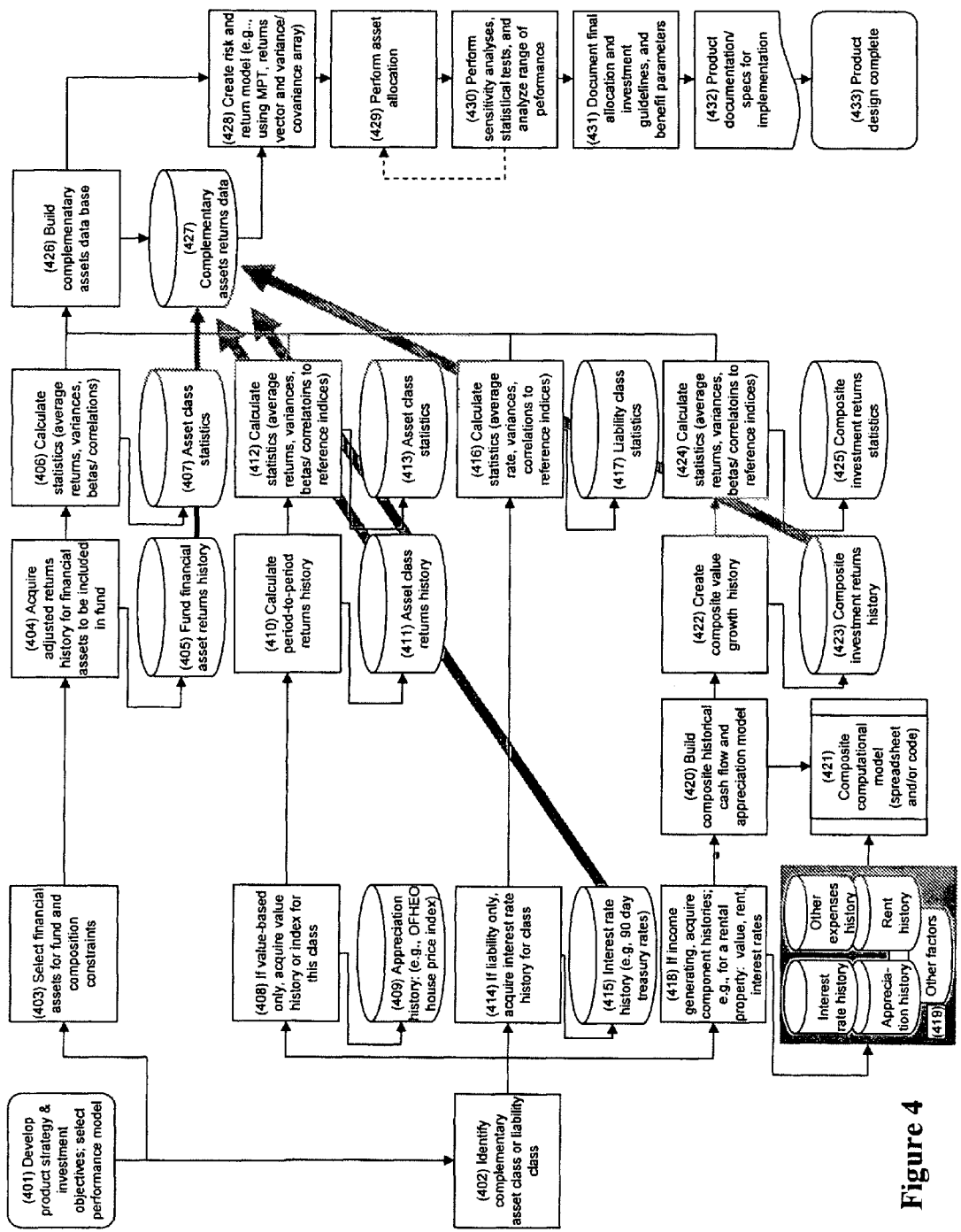
FIG. 4 is a diagram illustrating a method for designing a fund, in accordance with one embodiment of the invention.

FIG. 4 illustrates the general method for designing an investment fund showing steps to be undertaken by the designer of the fund. Step 401 comprises market research and product strategy work that is required in order for the fund designer to begin designing the fund. This includes identifying a market segment of potential investors in, or customers of, the fund, and understanding their investment behavior. In particular, this includes specifying typical real estate investment patterns, such as total dollars invested in real estate properties, classification of these investment properties by location, type of structure (for example, single family detached home, condominium, multi-family, and so on), degree of leverage (distribution of loan-to-value ratios), features of the financing terms (distribution of interest rates, most common terms, and distribution between fixed rate vs. various kinds of adjustable rate loans), and investor behaviors (length of investment horizon). For example, the fund designer may validate a class of investors defined by the following characteristics: owning 1-5 investment properties, with a total market value of $100,000 to $1,000,000, with variable rate financing at or near the current 90-day treasury rate plus a margin of 2.5%, in the San Francisco metropolitan area, which are predominantly residential rental units of 3 bedrooms, rented at median rental levels for the metropolitan area, subject to sale by the investor in the next 2-5 years.

The definition of the target market of investors, and the identification of their investment needs, lead to step 402, in which the designer documents the key features of the "complementary asset class" or "complementary liability class" held by the investor which the fund designer intends to match with the fund.

The investment company sponsoring the design of the fund will have performed marketing research to validate the size and commercial potential of the target market segment (in other words, those individual investors who are likely to benefit from the new fund) in order to cost-justify the design and creation of the new fund. In this case, there might be 200,000 real estate investors in the San Francisco area, of which 5% might be potential investors in the fund at an average expected investment rate of $200,000 each.

In step 401, corresponding to the definition of the needs of the target market segment (i.e., the needs of the potential fund investor), the fund designer then specifies investment goals for the fund itself. These goals would be consistent with goals that would be attractive to the market segment ("reduced risk", "higher returns"), and would be defined in terms of (1) the performance of the combined portfolio of direct real estate investment plus the investor's investment in the fund, and (2) the performance of the fund itself. For example, the fund may be defined as having risk and returns consistent with an S&P 500 index fund, specifically designed to match or exceed the expected returns of the reference index fund, and not exhibiting volatility greater than some margin over that of the reference index fund. Secondly, the fund designer would specify the performance of the combined portfolio (which contains some range of percentage of dollars invested in the fund in conjunction with direct investment in real estate) in terms of some improvement in either returns and/or risk compared to a baseline of an ordinary combined portfolio of an ordinary fund and direct investment in real estate.

In step 401, the fund designer also specifies some general ranges of investment parameters to which he/she will attempt to accommodate the new product. For example, this would specify a target range of fund dollars as a percent of total portfolio dollars: "Fund is expected to generate some benefit when the investor invests in the fund at a level that matches between 50% to 100% of the value of the investment property; for example, an investor who owns one property of $100,000, this means that he/she must match that investment with between $50,000 and $100,000 in the fund."

Step 401 also comprises selecting and defining the performance model for evaluating the investment benefits of the new fund when used in conjunction with the complementary investment class. One feature of the performance model is the risk model, since a benefit of the new fund is to improve risk-adjusted returns. Risk-adjusted returns can be expressed in various ways, but common metrics are: maximum return within an acceptable risk limit; minimum risk with returns meeting an acceptable returns threshold; maximum Sharpe Ratio. In these and other formulations, the definition of risk must be quantifiable, typically in some kind of statistical formulation. Typical formulations are standard deviation of returns (the Modern Portfolio Theory approach) and various formulations of downside risk. Though many risk models rely on data specific to the historical performance of the investment (such as historical rates of returns), the risk model can also account for external market and macro-economic factors, including but not limited to: interest rates, regional demographic trends, foreclosure rates and trends, indicators of overbuilding, and the percent of property-related financing held by subprime borrowers. In the example provided by FIG. 4, Modern Portfolio Theory is relied upon to illustrate the principles of fund design. This method can be extended by those skilled in the art to account for other quantitative risk models.

Finally, in step 401, the fund designer designs the basic make-up and investment objectives of the fund itself. For example, he/she might designate the fund to emulate an index ("S&P 500 index" or "EAFE Index") or an established asset class ("large cap", "international/emerging markets"), in a manner consistent with funds designed by those skilled in the art.

FIG. 6 provides an illustrative example of some of the elements of fund design strategy that would be documented as an outcome of step 401.

In steps 403 through 407, the fund designer collects and analyzes data required to perform portfolio performance analysis.

Steps 408 through 413 (value-based complementary asset class), 414 through 417 (liability complementary "asset" class), and 418 through 425 (income-generating complementary asset class) are analogous to steps 403 through 407 in that they provide the steps for gathering data and performing analysis required for the asset allocation analysis in steps 426 through 431. The fund manager will select the appropriate path (steps 408-413, steps 414-417, or steps 418-425) depending on the outcome of step 401 and documented in step 402.

All of these paths follow the same pattern of identifying the asset(s) or liability(ies) to be modeled, and then collecting historical data and converting these into quantifiable formulations needed for the combined asset allocation analysis. Modern Portfolio Theory is used as an example of how one might perform the asset allocation analysis, but it will be appreciated by those skilled in the art that other methods of portfolio allocation would follow the same logic.

In step 403, the fund designer will specifically identify those exchange-traded assets (such as stocks and bonds) that are appropriate for inclusion in the new fund. The qualification of these optional assets will have been performed separately or perhaps in step 401. Since it is feasible for the new fund to be a modified version of an existing fund, the component assets may be identical to those of the existing fund. The only substantive difference between the original fund and the new fund could be that the composition in terms of percentage holdings will have changed. It is also likely that the fund designed will specific allocation constraints on the composition of the fund assets. For example, the fund designer may limit all and any asset to comprise individually no more than, say, 5% of the total fund.

In step 404, the fund designer acquires such data as is necessary for the allocation analysis. In Modern Portfolio Theory, these data are primarily the historical financial asset returns, accounting for both value growth and dividends. Some services designate these the "adjusted historical returns" or they can be calculated based on "adjusted historical close". In the latter case, the returns are calculated by dividing the close at period N by the close at period N−1, and subtracting 1:

$$\text{Return}(N) = \text{Adjusted Close}(N)/\text{Adjusted Close}(N-1)-1$$

As noted in reference to step 401 above, the fund designer selects a model for investment performance analysis. This model will account for both investment returns and risk. The choice of model will determine what data are required for asset allocation purposes. For Modern Portfolio Theory, the data requirements are historical returns. For other models described in step 401, data requirements may include macro-economic factors (such as interest rates), demographics (such as population and wealth growth), construction and housing trends (capacity, costs of construction), and ownership and financing trends (foreclosure rates, degree of lending to investors and homeowners with subprime credit ratings). If such data are used, then various steps in FIG. 4 will be modified accordingly.

Step 405 is the accumulation of data for each asset in a database in a format that allows further analysis. Again, in the most limited application of Modern Portfolio Theory, these data would comprise historical returns for each asset. Step 406 optionally performs calculations to produce statistical characterizations of the historical and projected performance of these assets, including standard deviations (or variances) of the returns, average returns, betas with respect to a market reference, and so on. Other approaches besides Modern Portfolio Theory may require the generation of additional metrics, such as measures of downside risk.

As noted above, paths 408-413, 414-417, and 418-425 are analogous to 403-407. The reader will see that most of the steps are replicated. For example steps 406, 412, 416, and 424 rely on the same analytical approach, and the resulting tables 407, 413, 417, and 425 have the same structure.

The key distinctions among them are as follows: path 408-413 is based on the valuation or capital appreciation of the complementary asset class. For real estate, a common proxy for an asset class such as "residential properties in San Francisco" is the OFHEO home price index for the San Francisco metropolitan area. One application of this asset class, from an investor's standpoint, is a property (such as his/her primary residence) that is neither financed nor rented out. The owner may be concerned about the risk in the value of the property in anticipation of an imminent sale. If the owner expects to sell his/her residence in the foreseeable future, he/she may be interested in investing in a fund designed in such a way that its returns are as uncorrelated as possible with the appreciation in value of the property, so that total combined risk is as low as possible. In other words, if the real estate market sinks, at least the financial assets in the new fund will be relatively unaffected if chosen correctly.

Path 414-417 refers to the risk and cost of a loan. A potential application from the investor's standpoint is that the investor may consider using a loan secured by real estate on temporary basis as an investment strategy. By investing in the new fund, that is (in this example) designed to complement a variable rate mortgage, he can reduce the total risk in his portfolio. He may not have any other assets, or the investment in them may be illiquid beyond his/her planning horizon, and therefore not relevant. It must be noted that a loan will be treated as a negative percentage in the total portfolio model (steps 426-428). For example, $100,000 in real estate, $50,000 in the fund, and a $60,000 mortgage balance translate into a net portfolio of $90,000, where the real estate component is 111%, the fund percentage is 55.6%, and the mortgage is −66.7% (negative 66.7%) of the total portfolio.

Finally, path 418-425 refers to an investment comprising a complex mix of historic sources of economic returns and expenses, including but not limited to: economic returns associated with the appreciation in value of the property, economic returns associated with rental income, economic costs associated with financing costs, taxes, maintenance and capital improvements, and the economic opportunity cost associated with reduced vacancy rates. These historical factors are acquired and assembled in step 418, and stored in a database in step 419. In step 420, the fund designer builds a composite historical cash flow and appreciation model. An example of such a model is provided in FIG. 5. There is more detail regarding steps 419 through 423, and FIG. 5, below. It suffices to state at this point that step 423, the result of steps 418 through 422, is a composite net economic return. An example of this return is shown in FIG. 5, column 515, labeled as "Final result: investment yield history". This history and any other factors relevant to the specific allocation approach employed by the fund designer, is stored in database tables in FIG. 4 labeled as step 423 and 425, which are analogous to steps 405 and 407, 411 and 413, and 415 and 417, respectively, as described above.

In step 426, the fund designer combines the fund asset data from steps 405 and 407 with the corresponding data from either steps 411 and 413, or 415 and 417, or 423 and 425. In the simplest formulation, the resulting table in step 427 will have fields corresponding to the historical returns for each financial asset selected in step 403, and one field corresponding to the historical returns provided in step 411, or step 415, or step 423. The returns for each asset must be aligned by period of time. In other words, if there is a quarterly return for Jan. 5, 2005, for stock 1 of the fund, there should be a corresponding quarterly return for Jan. 5, 2005, of the complementary asset class. Having returns for matching time periods is a requirement for calculating covariances (or alternatively correlations) between the assets in step 428.

In step 428, the fund designer sets up an analytical model that calculates the financial performance of the portfolio. This performance is described by investment returns and investment risk. The risks are expressed quantitatively using the risk model selected in step 401. Using the example of Modern Portfolio Theory, step 428 determines risk based on the variances and covariances among all the assets, including those in the fund (identified in step 403) and the complementary asset class. However, a different performance model would perform the fund asset allocations based on factors relevant to that model.

FIG. 1 uses Modern Portfolio Theory as an illustrative example of an asset allocation methodology. The application of such an allocation model in step 429 generates a preliminary asset allocation for the fund. It is key to this method that the fund designer hold the percentage of the complementary asset (e.g., the real estate investment or the mortgage) fixed during the allocation, allowing only the composition of the fund assets to vary in the optimization process. Further, the fund designer must account for composition constraints identified in step 403.

The fund designer must also incorporate constraints or objectives identified in step 401. For example, if projected volatility of the fund itself is capped at 110% of another (comparison) fund's volatility, then that volatility is set as a constraint to the optimization process. Or if the objective is to maximize the Sharpe Ratio of the combined portfolio, then the fund designer would define maximum Sharpe Ratio as the objective function of optimization process.

In step 430, the fund designer tests the performance of the combined portfolio (fund plus complementary asset class) through the target range of investment ratios for the fund, which were proposed in step 401. The fund designer will perform other sensitivity tests both for the fund by itself and in combination with the complementary asset class to ensure that the investment meets any other standards or criteria for investment performance that may have been specified as part of the investment strategy in step 401, or which are imposed by the fund's sponsor. The fund designer will repeat steps 429 and 430, or any previous steps as necessary to refine or complete the design.

In step 431, the designer documents the allocation for the fund, as well as guidelines for investors under which conditions the fund serves as appropriate complement to existing asset classes, and the target ranges and expected benefits projected for the use of the fund. These serve as the basis for the prospectus. Step 432 is a further documentation of the product with guidance to the sponsor on the implementation of the fund, such as principles for ongoing allocation analysis.

Step 433 is the completion of the product design by the designer, and precedes the steps taken by the sponsor to bring the product to market, including, for example, developing the prospectus and testing and marketing the product.

Returning to FIG. 5, this figure presents features of a model that estimates historical rates of return for classes of investment assets. This model and the features shown are an illustrative example of such an analysis, and the actual analysis may include fewer or more, or different but similar features. Section 501 at the top summarizes a number of assumptions and factors used in the analysis. Most of these, such as the property tax rate, are static figures used in calculations for each period of time (each date, as shown in column 502) used in the analysis.

Column 503 (rent history) is an index of historical rent values that apply for each period of time. Column 504 (interest history) is an index of the effective historical financing rates that apply for each period of time. Column (505) is an index of the typical property values for a particular asset class (for example, defined as "median 3 bedroom rental unit"). Column 506 is the annual occupied gross rent based on the occupancy rate (in months per year) specified in section 501, and the monthly rent specified in column 503. Various costs, such as property tax, maintenance, insurance, and ongoing capital improvements, are estimated with factors in columns 507 and 508. Column 510 accounts for the cost of financing using the interest rate specified column 504, and using the leverage assumption in section 501. Columns 509 and 511 account for different effects of income tax. Column 512 shows net cash flows from rent after accounting for various expenses, interest payments, and taxes. Columns 513 and 514 show annualized economic returns (yields) corresponding to rents and appreciation, respectively, as percent of property value. Column 515 is the total annualized net economic return (or yield) on the investment during that period. Other factors in item 501 can be used in combination with the values in columns 513 and 514 to refine the estimates for volatility of investment returns over time.

FIG. 7 provides an example to summarize the method described above. In step 403 of FIG. 4, the fund designer selected a number of financial assets that were potential candidates for inclusion in the fund. As mentioned before, it is feasible that the new fund is a modification of an existing fund, so the fund components shown in section 701 of FIG. 7 could be the composition of either a new selection of potential assets, or an existing fund to be modified. In either case, it is labeled a "baseline fund". If it is an existing fund, it has known performance characteristics, shown in line 702. If it is a new mix of assets, its allocation can be optimized in order to determine best-case baseline performance characteristics from an investment standpoint. Again, line 702 serves to illustrate the baseline performance of this baseline fund. Using Modern Portfolio Theory as an example approach to illustrate the method, line 702 shows historical average returns for this portfolio, the historical standard deviation, and the Sharpe Ratio, which is a financial metric of the efficiency of the fund. The Sharpe Ratio is a measure of the excess returns (vs. returns from a nominally risk-free investment) provided by the fund divided by the risk incurred by the fund (expressed by the standard deviation). Other approaches not based on Modern Portfolio Theory or the Sharpe Ratio would provide other baseline performance metrics.

Line 703 of FIG. 7 replicates line 702, but shows the baseline fund as part of a combined portfolio that comprises 50% dollars invested in the fund and 50% invested in the complementary asset class (in this case, real estate property in San Francisco). Line 704 shows the historical performance (average returns, standard deviation, and Sharpe Ratio) of the San Francisco real estate, as an asset class. Line 705 shows the combined performance of the portfolio comprising the fund and the property. Note that the standard deviation of returns is not a weighted average of the standard deviations of the individual assets, since the portfolio standard deviation is a statistical result that depends also on the mutual correlations among the assets. Line 705 shows the investor the performance of the combined portfolio today: if an investor owns real estate property in San Francisco and invests cash into the baseline fund, he/she might expect to experience the returns and risks such as the ones shown across the combined portfolio in line 705.

Lines 706 through 707 show how the fund designer improves the allocation of the assets in the fund in order to improve portfolio performance, shown in line 708. Comparing line 708 to line 705, the investor can improve risk (reduced by 3%) while holding expected returns constant, according to this example. It is this potential improvement that is marketed to individual investors and which makes the new fund distinctive and commercially viable. Alternatively, it is possible to hold risk constant while improving expected returns. For the fund designer, the difference in the allocations between the baseline fund and the complemented fund is based on whether the fund allocation is optimized only within the fund itself, or as part of a larger portfolio that also includes the real estate.

Figure 8:
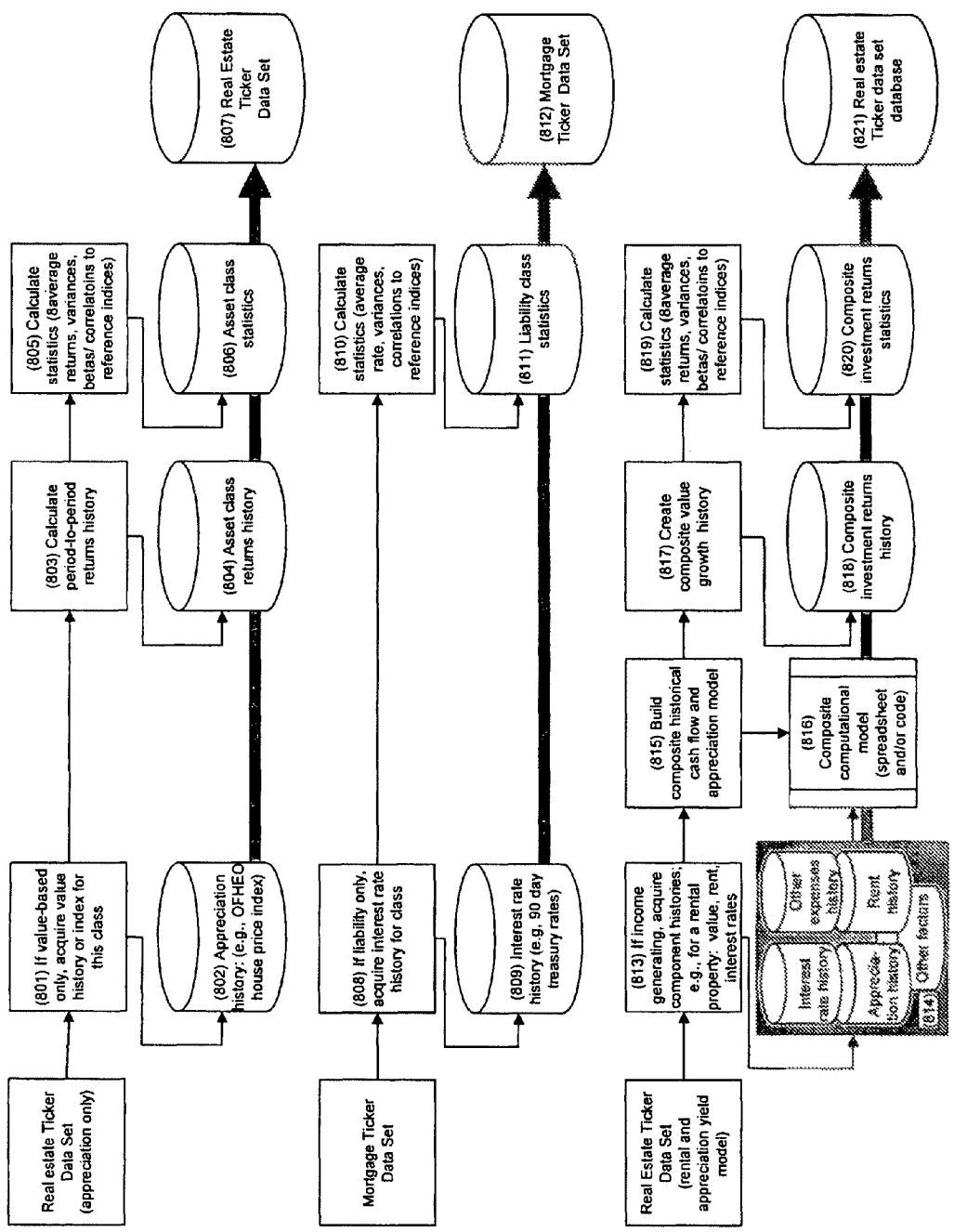
FIG. 8 illustrates a method for calculating an exemplary composite rental return index for real estate in the defined geographic region and distributing the index as a ticker data set, in accordance with one embodiment of the invention.

FIG. 8 illustrates the method whereby real estate values, mortgages, and rental investment properties are converted into ticker-equivalent data sets that can be sold, reported, and used in interactive websites to help investors and analysts model real estate-related investments in the same terms as exchange-traded financial assets. Steps 801 through 807 show the conversion of historical house price index data (such as the OFHEO index) into a data set that allows the investor or analyst to treat real estate property as if it were part of an indexed asset class. In this case, the focus is on value appreciation only (in contrast, for example, to investment returns that are a combination of capital appreciation and net rent cash flows). In step 801, the developer of the data feed acquires or builds an index the reflects historical real estate values for some class of property. As an example, the OFHEO index for a specific metropolitan statistical area could be selected to represent an asset class defined as "residential property in metropolitan area X". Step 802 is the table that holds this historical data. In step 803, the developer calculates period-to-period returns in the same manner as described in FIG. 4, step 404, and step 805 is similar to step 406 of FIG. 4. However, there may be a number of additional calculations, including forecasts, calculations of betas and alphas, and various ratios, as necessary to accompany the ticker data set. Step 805 may also incorporate additional factors about the particular asset class, such as dollar volume of properties sold in a time period, days on market, distribution of property types sold, and factors relating to risk such as foreclosure rates in the region associated with the asset class. Examples of these ratios and factors are summarized in FIGS. 9 through 13 and explained in more detail below.

Steps 808 to 812 are analogous to steps 801 through 807, but the "asset" under analysis is a loan obligation such as a mortgage. A specific application for this method is an investor who wishes to model the effect of holding one or more mortgages. The Mortgage Ticker Data Set produced in step 812 would represent the loan balance owed on a mortgage and would be modeled as a negative asset whose characteristics (standard deviation, beta, alpha, etc.) would be produced in step 810.

Steps 813 through 821 are also analogous to steps 801 through 807, relying on the method described in reference to steps 418 through 425 of FIG. 4, and illustrated with the model shown in FIG. 5.

FIGS. 9 through 13 show different representations of data created via the method described in claims 10 to 14. FIGS. 9 through 12 are modeled after existing analytical reports provided on the internet for investors researching exchange-traded financial investments. FIG. 9 is a summary of trading history and volumes; FIG. 10 is a summary of adjusted historical "closing" values; FIG. 11 shows analysts' ratings and the Morningstar "nine box" categorization tool; and FIG. 12 shows risk analysis metrics. In all of these cases, (FIGS. 9 through 12) existing tools have been adapted to present equivalent or similar metrics for an investment property in financial analysis terms, thereby giving the investor the ability to analyze real estate investments (or mortgage obligations) as if they were investments in exchange traded assets. Furthermore, this formulation also enables the inclusion of real estate assets in investment management and asset allocation tools on the basis of a ticker symbol. In this way, the investor enters a ticker symbol that corresponds to the asset class of his/her investment property (or mortgage) into a website or a software application, and is able to access pricing histories, ratios, risk and trend metrics that are expressed in the same terms as financial assets.

In FIG. 9, "closing" values could be actual daily pricing derived, for example, from exchange-traded futures contracts available on the Chicago Mercantile Exchange, or a forecast for the day based on the historical indexes described above. In real estate terms, concepts equivalent to "volume" and "market cap" would be based on dollars invested in properties in the asset class defined by the relevant index. For example, if the relevant index for the market class is the OFHEO house price index for a certain metropolitan area, volume of sales would be an estimated daily volume of house price sales in that metropolitan area, and market cap would be an estimate of total housing value owned in that metropolitan area. FIG. 10, historical values, would reflect those values produced in the method described in FIG. 8. FIG. 11 would apply to a rental property, whose investment yield includes both appreciation returns and rental returns. The ratio of rental returns to appreciation returns estimated for the asset class would be a significant factor in determining whether the investment in property in that class is primarily a "growth" investment or a "value" investment. The size and diversity of the geographical market would be one factor which would determine whether the real estate asset class is "large" or "small". Agency or analysts' ratings of investment suitability could be reported. FIG. 12 provides a risk analysis; many of the factors commonly reported are derived from established frameworks such as Modern Portfolio Theory formulation, and include reporting standard deviation of returns, and correlation of the returns with a market index (also known as the Beta). These can be reported for real estate investments using the same, or slightly adapted equations as those used for financial exchange traded assets.

Finally, FIG. 13 presents some metrics that are examples of analytical results that are specific to real estate as an asset class, and would be reported on a supplementary basis, unlike the financial-equivalent metrics shown in FIGS. 9-12.

It will be understood that various steps in the methods described above may be implemented using software operating on a general purpose or special computer.

Finally, it will be appreciated by those skilled in the art that still further changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A computer system configured to create an investment fund to diversify risks in directly owned real estate assets, wherein the investment fund is configured to be purchased in proportion to a dollar amount of directly owned real estate assets, the system comprising:

memory storing processor executable instructions; and a processor executing said processor executable instructions, wherein said processor executable instructions when executed causes said computer system to perform steps comprising:

(a) selecting a target range of proportions of monetary value in directly owned real estate assets to monetary value in investments to be made in an investment fund, and selecting at least one performance criterion for the target range;

(b) selecting a target geographical region;

(c) identifying a composite portfolio that comprises (i) at least one directly owned real estate asset in the target geographical region, and (ii) variable assets that are more liquid than the at least one directly owned real estate asset, and wherein the composite portfolio is configured such that the proportion of monetary value of the at least one directly owned real estate asset to monetary value of the variable assets is within the target range;

(d) calculating an allocation of the variable assets in the composite portfolio that diversifies risks associated with the at least one directly owned real estate asset in the composite portfolio, said calculating comprising:

treating the at least one directly owned real estate asset in the composite portfolio as a non-variable asset, calculating a risk profile for the non-variable asset based on data relating to value of the at least one directly owned real estate asset in the target geographic region, calculating a mix of the variable assets that has a risk profile that complements the risk profile of the non-variable asset, performing at least one iteration of:

calculating performance of the composite portfolio, based on said mix of the variable assets, at a plurality of proportions in said target range of proportions, to ensure that said mix of the variable assets diversifies risks in real estate in the target geographical region when purchased by individuals in different amounts within the target range of proportions, terminating the at least one iteration when the performance satisfies said at least one performance criterion, and refining the mix of the variable assets when the performance fails said at least one performance criterion; and selecting said mix of the variable assets as said allocation that diversifies risks associated with the at least one directly owned real estate asset; and (e) configuring the investment fund based on the mix of variable assets in the selected allocation, and making the investment fund available for purchase by individuals who directly own real estate assets in the target geographic region.

2. A computer system as in claim 1, wherein step (b) further comprises selecting a target type of directly owned real estate assets, wherein the target type is selected from the group consisting of rental properties and owner-occupied residential real estate; and wherein the at least one directly owned real estate asset is of the target type such that the risk profile for the non-variable asset is based at least in part on the target type.

3. A computer system as in claim 1, wherein step (b) further comprises selecting a target real estate class type of directly owned real estate assets, wherein the target real estate class type is selected from the group consisting of a particular number or range of bedrooms, detached, multi-unit, suburban or urban; and wherein the at least one directly owned real estate asset is of the target real estate class type such that the risk profile for the non-variable asset is based at least in part on the target real estate class type.

4. A computer system as in claim 1, wherein step (b) further comprises selecting a target financing range, wherein the target financing range corresponds to a percentage range of value in the directly owned real estate asset which is subject to financing; and wherein the at least one directly owned real estate asset satisfies the target financing range such that the risk profile for the non-variable asset is based at least in part on the target financing range.

5. A computer system as in claim 1, wherein calculating performance of the composite portfolio comprises calculating risks for the composite portfolio and returns for the composite portfolio.

6. A computer system as in claim 5, wherein the risks for the composite portfolio correspond at least in part to a symmetric formulation of the returns for the composite portfolio over a plurality of discrete time periods.

7. A computer system as in claim 6, wherein the symmetric formulation corresponds to a standard deviation of returns for the composite portfolio over the plurality of discrete time periods.

8. A computer system as in claim 5, wherein the risks for the composite portfolio correspond at least in part to a non-symmetric formulation of the returns for the composite portfolio over a plurality of discrete time periods, wherein said non-symmetric formulation accounts for downside risk.

9. A computer system as in claim 5, wherein the risks for the composite portfolio are calculated based at least in part on a statistical characterization of at least one of: historical values, estimated cash flows, and actual cash flows of assets in the composite portfolio.

10. A computer system as in claim 9, wherein the risks for the composite portfolio are further calculated based on one or more external factors selected from the group comprising: population and wealth growth, housing capacity, costs of construction, foreclosure rates, degree of lending to investors and homeowners with subprime credit ratings, and ownership tenure.

11. A computer system as in claim 10, wherein the one or more external factors are representative of factors in the target geographical region.

12. A computer system as in claim 10, wherein said processor executable instructions when executed causes said computer system to perform further steps comprising accessing one or more databases storing data corresponding to said one or more external factors.

13. A computer system as in claim 9, wherein the risks for the composite portfolio are further calculated based on interest rates.

14. A computer system as in claim 5, wherein the at least one performance criterion comprises at least one of: lesser risk of the composite portfolio compared to risk of the at least one directly owned real estate asset, and greater return of the composite portfolio compared to return of the at least one directly owned real asset, for said plurality of proportions in said target range of proportions.

15. A computer system as in claim 1, wherein the at least one performance criterion comprises a maximization criterion such that said performance criterion is satisfied when refining said mix of the variable assets does not provide further improvement.

16. A computer system as in claim 15, wherein said maximization criterion comprises maximizing a risk-adjusted return of said composite portfolio at said plurality of proportions in said target range of proportions.

17. A non-transitory computer-readable medium storing software for creating an investment fund to diversify risks in directly owned real estate assets, wherein the investment fund is configured to be purchased in proportion to a dollar amount of directly owned real estate assets, wherein the software, when executed by a computer system, causes the computer system to perform steps comprising:
(a) selecting a target range of proportions of monetary value in directly owned real estate assets to monetary value in investments to be made in an investment fund, and selecting at least one performance criterion for the target range;
(b) selecting a target geographical region;
(c) identifying a composite portfolio that comprises (i) at least one directly owned real estate asset in the target geographical region, and (ii) variable assets that are more liquid than the at least one directly owned real estate asset, and wherein the composite portfolio is configured such that the proportion of monetary value of the at least one directly owned real estate asset to monetary value of the variable assets is within the target range;
(d) calculating an allocation of the variable assets in the composite portfolio that diversifies risks associated with the at least one directly owned real estate asset in the composite portfolio, said calculating comprising:
treating the at least one directly owned real estate asset in the composite portfolio as a non-variable asset,
calculating a risk profile for the non-variable asset based on data relating to value of the at least one directly owned real estate asset in the target geographic region,
calculating a mix of the variable assets that has a risk profile that complements the risk profile of the non-variable asset,
performing at least one iteration of:
calculating performance of the composite portfolio, based on said mix of the variable assets, at a plurality of proportions in said target range of proportions, to ensure that said mix of the variable assets diversifies risks in real estate in the target geographical region when purchased by individuals in different amounts within the target range of proportions,
terminating the at least one iteration when the performance satisfies said at least one performance criterion, and
refining the mix of the variable assets when the performance fails said at least one performance criterion; and
selecting said mix of the variable assets as said allocation that diversifies risks associated with the at least one directly owned real estate asset; and (e) configuring the investment fund based on the mix of variable assets in the selected allocation, and making the investment fund available for purchase by individuals who directly own real estate assets in the target geographic region.

18. A non-transitory computer-readable medium as in claim 17, wherein step (b) further comprises selecting a target type of directly owned real estate assets, wherein the target type is selected from the group consisting of rental properties and owner-occupied residential real estate; and wherein the at least one directly owned real estate asset is of the target type such that the risk profile for the non-variable asset is based at least in part on the target type.

19. A non-transitory computer-readable medium as in claim 17, wherein step (b) further comprises selecting a target real estate class type of directly owned real estate assets, wherein the target real estate class type is selected from the group consisting of a particular number or range of bedrooms, detached, multi-unit, suburban or urban; and wherein the at least one directly owned real estate asset is of the target real estate class type such that the risk profile for the non-variable asset is based at least in part on the target real estate class type.

20. A non-transitory computer-readable medium as in claim 17, wherein step (b) further comprises selecting a target financing range, wherein the target financing range corresponds to a percentage range of value in the directly owned real estate asset which is subject to financing; and wherein the at least one directly owned real estate asset satisfies the target financing range such that the risk profile for the non-variable asset is based at least in part on the target financing range.

21. A non-transitory computer-readable medium as in claim 17, wherein calculating performance of the composite portfolio comprises calculating risks for the composite portfolio and returns for the composite portfolio.

22. A non-transitory computer-readable medium as in claim 21, wherein the risks for the composite portfolio correspond at least in part to a symmetric formulation of the returns for the composite portfolio over a plurality of discrete time periods.

23. A non-transitory computer-readable medium as in claim 22, wherein the symmetric formulation corresponds to a standard deviation of returns for the composite portfolio over the plurality of discrete time periods.

24. A non-transitory computer-readable medium as in claim 21, wherein the risks for the composite portfolio correspond at least in part to a non-symmetric formulation of the returns for the composite portfolio over a plurality of discrete time periods, wherein said non-symmetric formulation accounts for downside risk.

25. A non-transitory computer-readable medium as in claim 21, wherein the risks for the composite portfolio are calculated based at least in part on a statistical characterization of at least one of: historical values, estimated cash flows, and actual cash flows of assets in the composite portfolio.

26. A non-transitory computer-readable medium as in claim 25, wherein the risks for the composite portfolio are further calculated based on one or more external factors selected from the group comprising: population and wealth growth, housing capacity, costs of construction, foreclosure rates, degree of lending to investors and homeowners with subprime credit ratings, and ownership tenure.

27. A non-transitory computer-readable medium as in claim 26, wherein the one or more external factors are representative of factors in the target geographical region.

28. A non-transitory computer-readable medium as in claim 26, wherein said software when executed causes said computer system to perform further steps comprising accessing one or more databases storing data corresponding to said one or more external factors.

29. A non-transitory computer-readable medium as in claim 25, wherein the risks for the composite portfolio are further calculated based on interest rates.

30. A non-transitory computer-readable medium as in claim 21, wherein the at least one performance criterion comprises at least one of: lesser risk of the composite portfolio compared to risk of the at least one directly owned real estate asset, and greater return of the composite portfolio compared to return of the at least one directly owned real asset, for said plurality of proportions in said target range of proportions.

31. A non-transitory computer-readable medium as in claim 17, wherein the at least one performance criterion comprises a maximization criterion such that said performance criterion is satisfied when refining said mix of the variable assets does not provide further improvement.

32. A non-transitory computer-readable medium as in claim 31, wherein said maximization criterion comprises maximizing a risk-adjusted return of said composite portfolio at said plurality of proportions in said target range of proportions.

* * * * *